United States Patent
Satoh

(10) Patent No.: US 10,029,440 B2
(45) Date of Patent: Jul. 24, 2018

(54) METHOD AND APPARATUS FOR FABRICATING THREE-DIMENSIONAL OBJECT AND RECORDING MEDIUM

(71) Applicant: Shinichiroh Satoh, Kanagawa (JP)

(72) Inventor: Shinichiroh Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 233 days.

(21) Appl. No.: 15/046,550

(22) Filed: Feb. 18, 2016

(65) Prior Publication Data

US 2016/0243805 A1  Aug. 25, 2016

(30) Foreign Application Priority Data

Feb. 19, 2015 (JP) .................................. 2015-031115
Aug. 26, 2015 (JP) .................................. 2015-167223

(51) Int. Cl.
| | | |
|---|---|---|
| B29C 64/153 | (2017.01) | |
| B29C 64/165 | (2017.01) | |
| B29C 64/40 | (2017.01) | |
| B33Y 10/00 | (2015.01) | |
| B32B 5/16 | (2006.01) | |
| B29C 67/00 | (2017.01) | |

(52) U.S. Cl.
CPC .............. *B32B 5/16* (2013.01); *B29C 64/153* (2017.08); *B29C 64/165* (2017.08); *B29C 64/40* (2017.08); *B29C 67/0081* (2013.01); *B29C 67/0092* (2013.01); *B33Y 10/00* (2014.12)

(58) Field of Classification Search
CPC ....... B29C 64/00; B29C 64/10; B29C 64/141; B29C 64/153; B29C 64/165; B29C 64/40; B33Y 10/00; B33Y 40/00
See application file for complete search history.

(56) References Cited

U.S. PATENT DOCUMENTS

| | | | | |
|---|---|---|---|---|
| 9,694,542 B2 * | 7/2017 | Sakura | ................ | B29C 67/0081 |
| 2017/0072646 A1 * | 3/2017 | Sakura | ................ | B29C 67/0092 |
| 2017/0326789 A1 * | 11/2017 | Kimblad | ............... | B29C 64/153 |

FOREIGN PATENT DOCUMENTS

| | | | | |
|---|---|---|---|---|
| JP | 2004-508222 | 3/2004 | | |
| JP | 2005-059324 | 3/2005 | | |
| JP | 2012-030389 | 2/2012 | | |
| JP | 2012-030530 | 2/2012 | | |
| JP | 2013-067120 | 4/2013 | | |
| JP | 2014-088046 | 5/2014 | | |
| JP | 2017052208 A * | 3/2017 | ......... | B29C 67/0092 |
| WO | WO2002/020251 A2 | 3/2002 | | |

OTHER PUBLICATIONS

JP Application 2014-186072, filed Sep. 12, 2014, Priority Document for U.S. Pat. No. 9,694,542. Machine Translation Attached. Publication Date unknown.*

* cited by examiner

*Primary Examiner* — Michael A Tolin

(74) *Attorney, Agent, or Firm* — Cooper & Dunham LLP

(57) ABSTRACT

A method is provided of fabricating a three-dimensional object by laminating layered fabrication objects. Each layered fabrication object includes bonded powder of a powder layer. The method includes forming a sacrificial fabrication object separable from the three-dimensional object via the powder below a fabrication area of a layered fabrication object having a lower surface in contact with the powder, in forming the lower surface in contact with the powder.

3 Claims, 21 Drawing Sheets

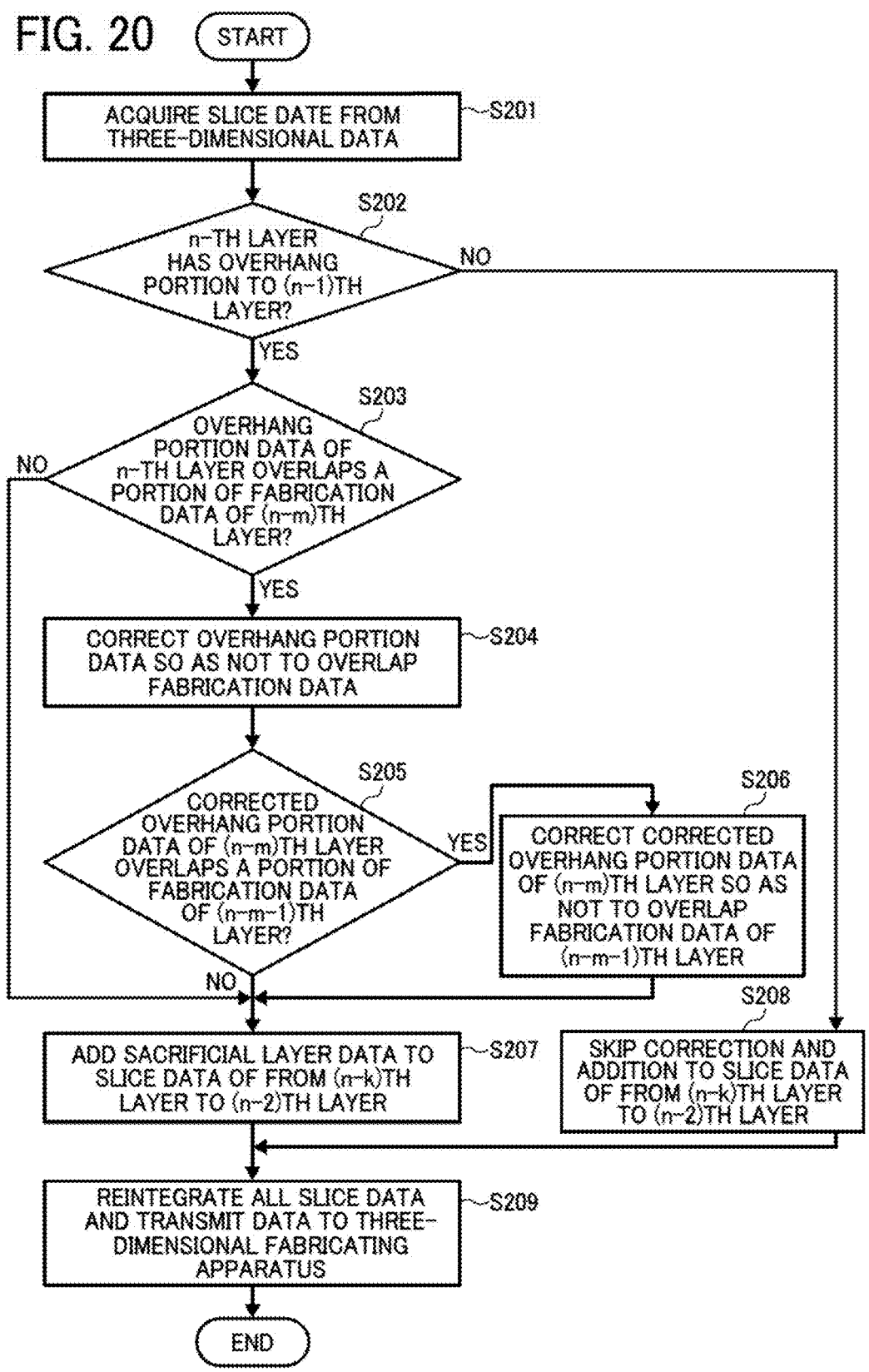

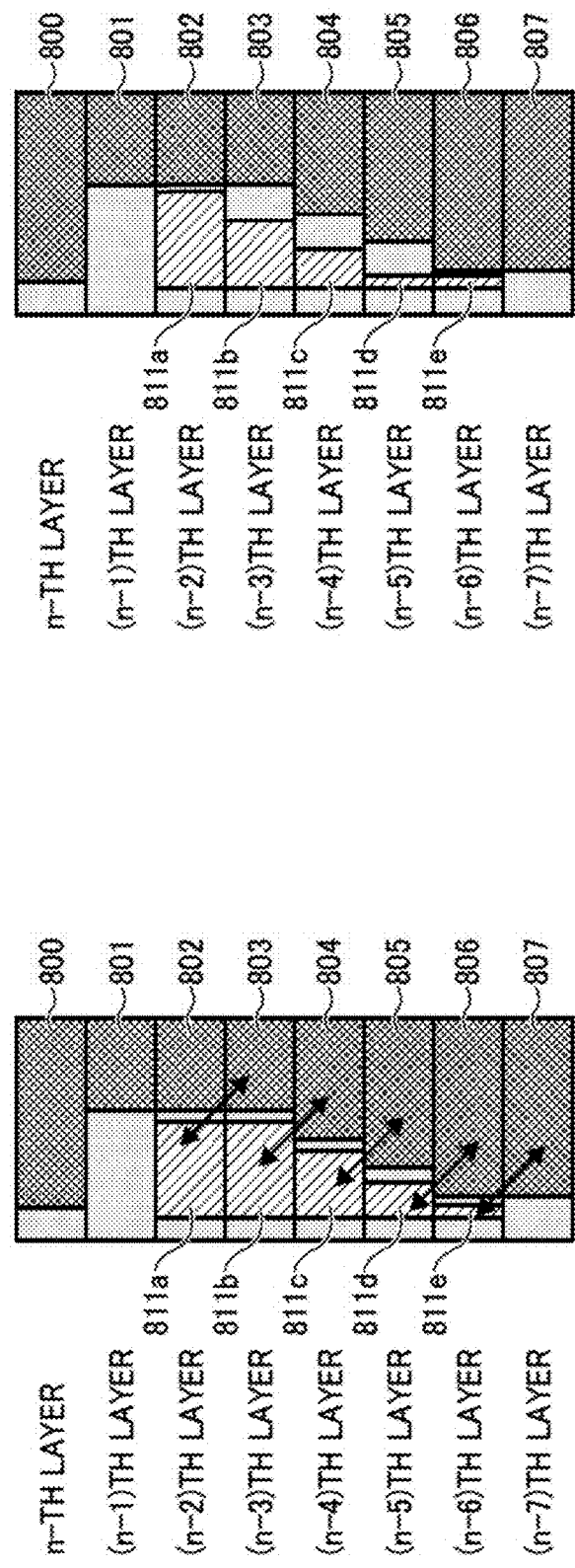

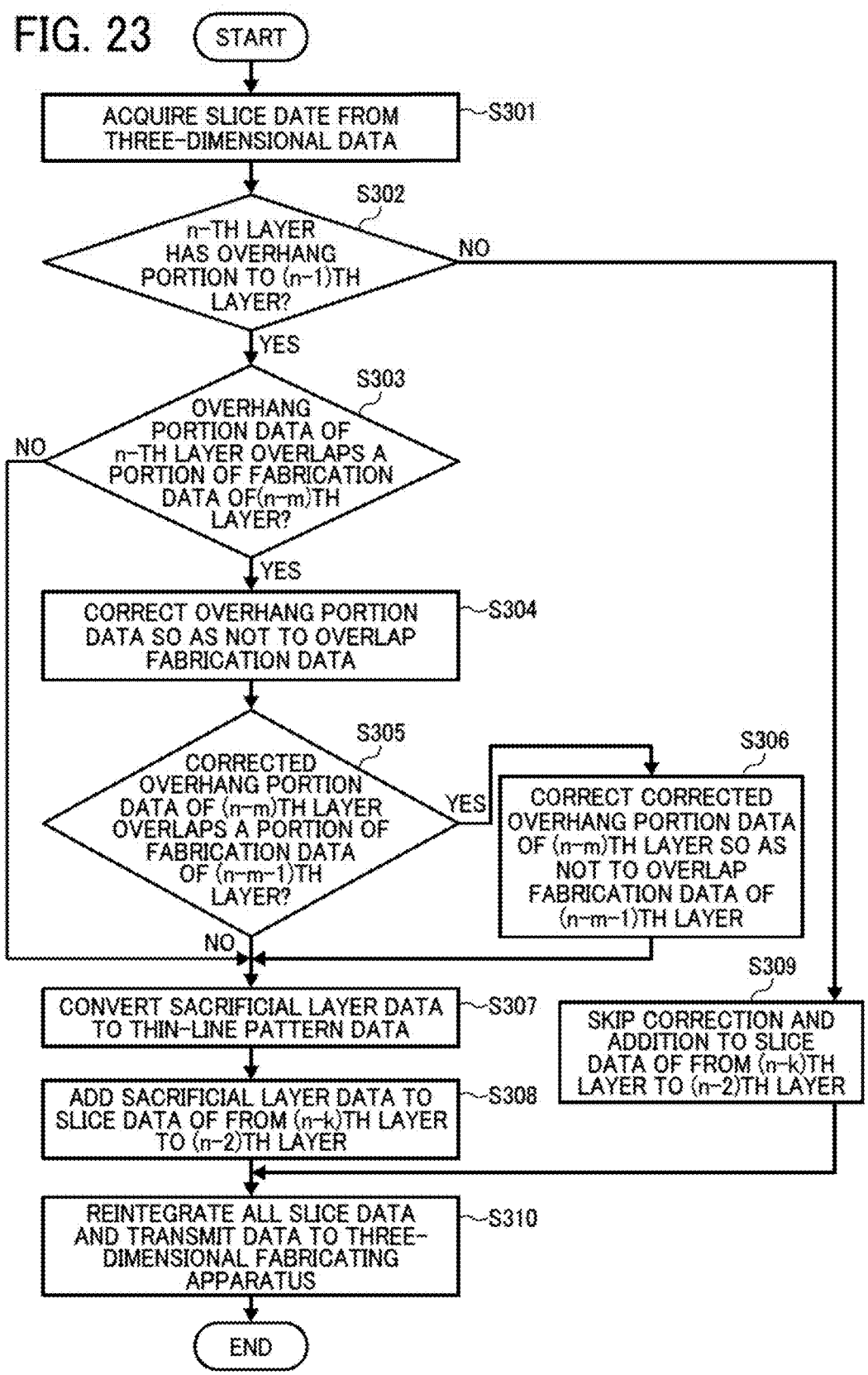

METHOD AND APPARATUS FOR FABRICATING THREE-DIMENSIONAL OBJECT AND RECORDING MEDIUM

CROSS-REFERENCE TO RELATED APPLICATIONS

This patent application is based on and claims priority pursuant to 35 U.S.C. § 119(a) to Japanese Patent Application Nos. 2015-031115, filed on Feb. 19, 2015, and 2015-167223, filed on Aug. 26, 2015, in the Japan Patent Office, the entire disclosure of each of which is hereby incorporated by reference herein.

BACKGROUND

Technical Field

Aspects of the present disclosure relate to a method and an apparatus for fabricating a three-dimensional object and a recording medium storing a program for causing a computer to execute processing of creating fabrication data of layered fabrication objects in fabricating a three-dimensional object.

Related Art

A solid (three-dimensional) fabricating apparatus uses, for example, a lamination fabrication method to fabricate a solid (three-dimensional) object. In this method, for example, flattened metal or non-metal powder is formed in a shape of layer (referred to as "powder layer") on a fabrication stage, and fabrication liquid is discharged from a head onto the powder layer on the fabrication stage to form a layered fabrication object (referred to as "fabrication layer") in which powder particles bond together. By repeating a step of forming the next powder layer on the fabrication layer and the next fabrication layer on the next powder layer, multiple fabrication layers are laminated one on another to fabricate a three-dimensional object.

SUMMARY

In an aspect of the present disclosure, there is provided a method of fabricating a three-dimensional object by laminating layered fabrication objects. Each layered fabrication object includes bonded powder of a powder layer. The method includes forming a sacrificial fabrication object separable from the three-dimensional object via the powder below a fabrication area of a layered fabrication object having a lower surface in contact with the powder, in forming the lower surface in contact with the powder.

In another aspect of the present disclosure, there is provided a recording medium storing a program for causing a computer to execute processing of creating fabrication data of layered fabrication objects in fabricating a three-dimensional object by laminating the layered fabrication objects. Each layered fabrication object includes bonded powder of a powder layer. The processing includes forming a sacrificial fabrication object separable from the three-dimensional object via the powder below a fabrication area of a layered fabrication object having a lower surface in contact with the powder, in forming the lower surface in contact with the powder.

In still another aspect of the present disclosure, there is provided a system that includes a three-dimensional fabricating apparatus configured to bond powder of a powder layer to form a layered fabrication object and laminate a plurality of layered fabrication objects to fabricate a three-dimensional object; and an apparatus configured to provide the three-dimensional fabricating apparatus with fabrication data for forming a sacrificial fabrication object separable from the three-dimensional object via the powder below a fabrication area of a layered fabrication object having a lower surface in contact with the powder, in forming the lower surface in contact with the powder.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 20 is a flow chart of a second example of processing of creating fabrication data by a client computer of a fabrication data creation device executed based on a program according to an embodiment of the present disclosure;

FIGS. 22A through 22D are illustrations of a process of creating sacrificial layer data for a plurality of layers;

FIG. 23 is a flow chart of a third example of processing of creating fabrication data by a client computer of a fabrication data creation device executed based on a program according to an embodiment of the present disclosure;

Figure 1:
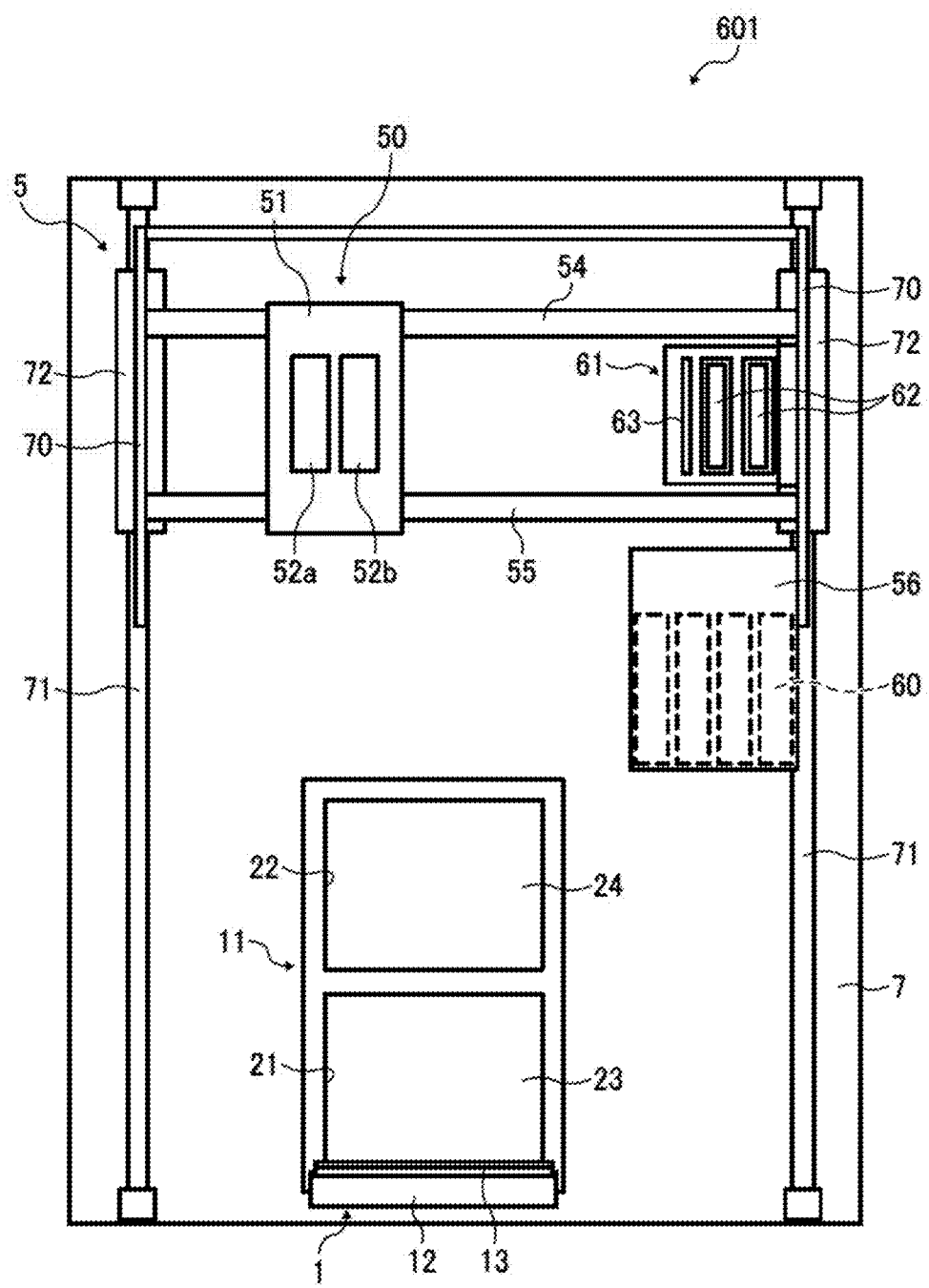
FIG. 1 is a plan view of a three-dimensional fabricating apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, favorable embodiments of the present disclosure will be described in detail based on the attached drawings. Note that the embodiments to be described below are mere favorable embodiments of the present disclosure, and thus technically favorable various limitations are included. However, the scope of the present disclosure is not unreasonably limited by the description below, and not all of configurations to be described in the present embodiment are essential requirements of the present disclosure.

Figure 2:
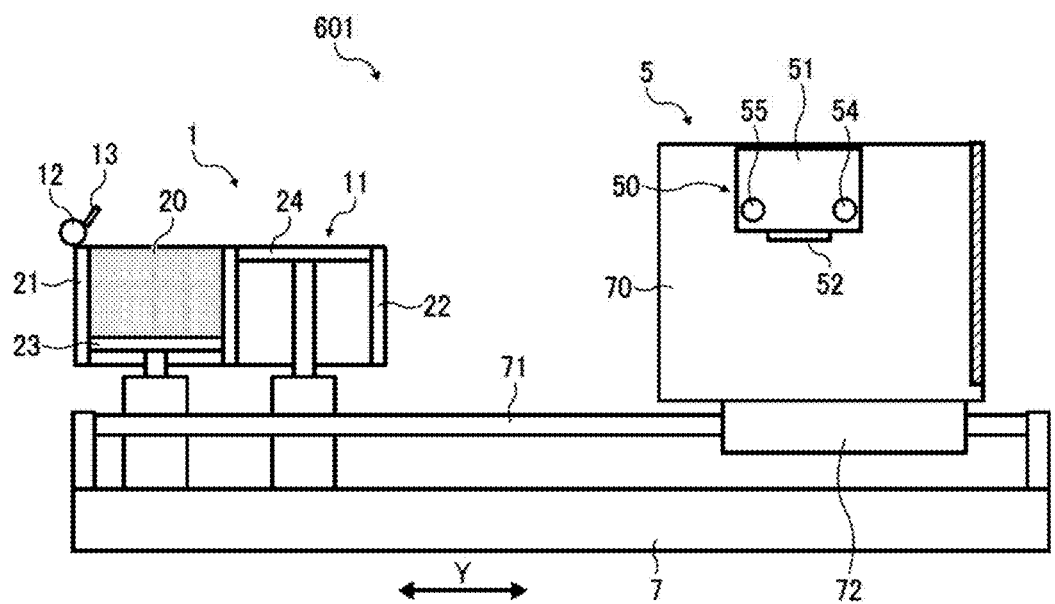
FIG. 2 is a side view of the three-dimensional fabricating apparatus of FIG. 1.
Figure 3:
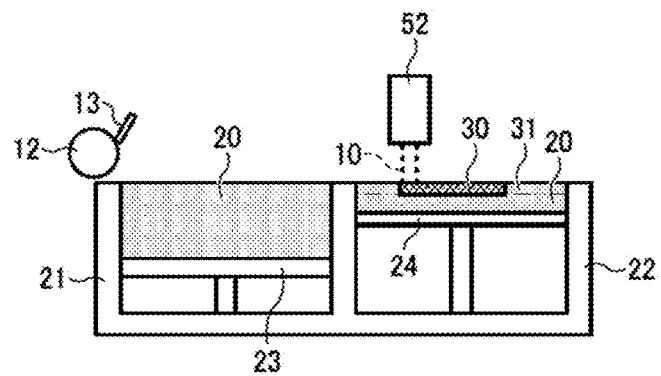
FIG. 3 is a cross-sectional view of a fabrication section of the three-dimensional fabricating apparatus.
Figure 4:
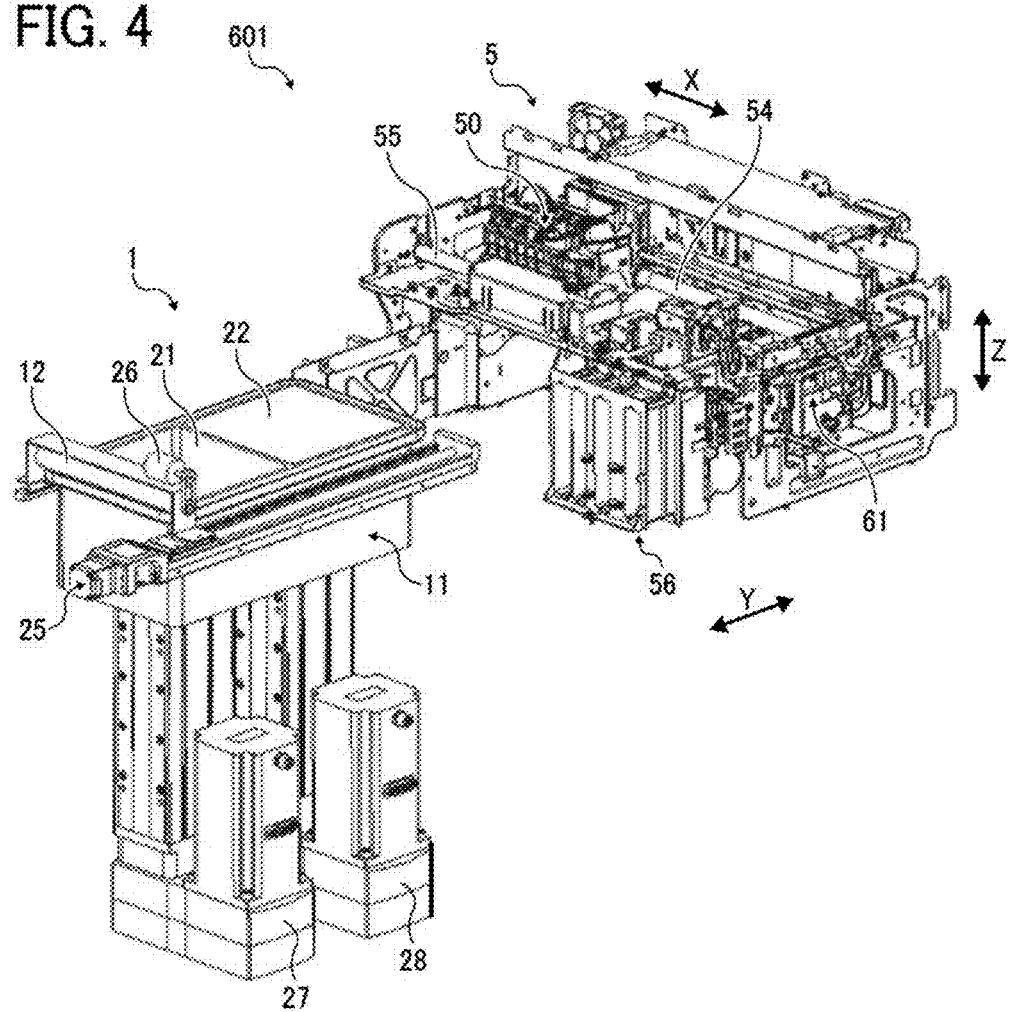
FIG. 4 is a perspective view of a portion of the fabrication section.
Figure 5:
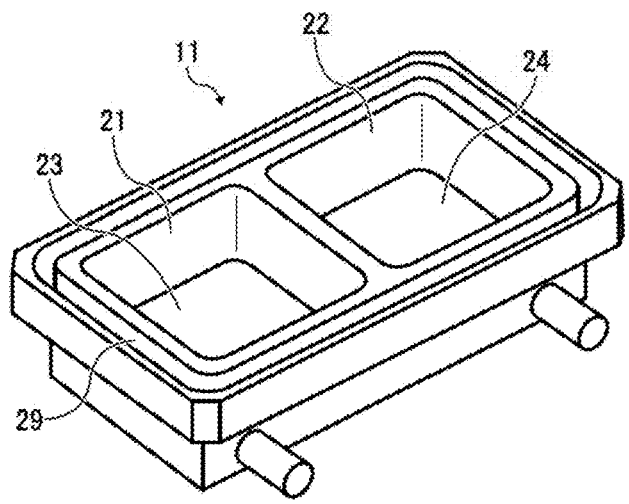
FIG. 5 is a perspective view of the fabrication section

Hereinafter, embodiments of the present disclosure are described with reference to the attached drawings. First, a three-dimensional fabricating apparatus according to a first embodiment of this disclosure is described with reference to FIGS. 1 through 5. FIG. 1 is a plan view of the three-dimensional fabricating apparatus according to the first embodiment of this disclosure. FIG. 2 is a cross-sectional view of a fabrication section of the three-dimensional fabricating apparatus. In FIG. 3, a state of the fabrication section during fabrication is illustrated. FIG. 4 is a partial perspective view of the three-dimensional fabricating apparatus according to the first embodiment of the present disclosure. FIG. 5 is a perspective view of the fabrication section.

In this embodiment, a three-dimensional fabricating apparatus 601 is a powder fabricating apparatus (also referred to as a powder fabricating apparatus). The three-dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates a three-dimensional object by discharging fabrication liquid 10 onto a powder layer 31 that is overlaid in layers in the fabrication section 1.

The fabrication section 1 includes a powder chamber 11 and a flattening roller 12 as a rotator that is a flattening member (recoater). Note that the flattening member may be, for example, a plate member (blade) instead of the rotator.

The powder chamber 11 includes a supply chamber 21 to supply powder 20 and a fabrication chamber 22 in which fabrication layers 30 are laminated to fabricate an object. A bottom portion of the supply chamber 21 serves as a supply stage 23 and is movable upward and downward in a vertical direction (height direction). Similarly, a bottom portion of the fabrication chamber 22 serves as a fabrication stage 24 and is movable upward and downward in the vertical direction (height direction). A three-dimensional object in which the fabrication layers 30 are laminated is fabricated on the fabrication stage 24.

For example, as illustrated in FIG. 4, a motor 27 moves the supply stage 23 upward and downward along a direction indicated by arrow Z. Likewise, a motor 28 moves the fabrication stage 24 upward and downward along a direction indicated by arrow Z.

The flattening roller 12 supplies the powder 20 supplied on the supply stage 23 of the supply chamber 21, to the fabrication chamber 22 and flattens the powder 20 with the flattening roller 12 as flattening member to form a powder layer 31.

The flattening roller 12 is disposed to be relatively reciprocally movable with respect to a stage surface (a surface on which powder 20 is stacked) of the fabrication stage 24 along a direction indicated by arrow Y in FIG. 2, which is a direction along the stage surface of the fabrication stage 24. The flattening roller 12 is moved by a reciprocal moving assembly 25. The flattening roller 12 is driven to rotate by a motor 26.

The fabrication unit 5 includes a liquid discharge unit 50 to discharge fabrication liquid 10 to the powder layer 31 on the fabrication stage 24.

The liquid discharge unit 50 includes a carriage 51 and two liquid discharge heads (hereinafter referred to as simply "head(s)") 52a and 52b mounted on the carriage 51. In FIG. 1, two liquid discharge heads are illustrated. However, in some embodiments, the number of liquid discharge heads is one or three or more.

The carriage 51 is movably held with guides 54 and 55. The guides 54 and 55 are held with lateral side plates 70 so as to be movable upward and downward.

Via a main scan moving unit including, e.g., a motor, a pulley, and a belt, a X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to as "heads 52" unless distinguished) includes two nozzle rows, each including a plurality of nozzles arrayed to discharge liquid. Two nozzle rows of one head 52a discharge, for example, cyan fabrication liquid and magenta fabrication liquid. Two nozzle rows of the other head 52a discharge, for example, yellow fabrication liquid and black fabrication liquid. Note that the configuration of head is not limited to the above-described configuration of the head 52 and may be any other suitable configuration.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes.

The carriage 51 is integrally molded with a post powder supply 80 as a post powder supplier to supply the powder 20 on at least an adhesion area of the fabrication liquid 10 when one fabrication layer 30 is formed in the fabrication chamber 22.

Further, a maintenance assembly 61 to maintain and recover the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is sucked from nozzles. Thus, powder clogged at the nozzles and thickened fabrication liquid are discharged. Then, the wiper 63 wipes the nozzle faces to form menisci in the nozzles (with the interiors of the nozzles being in negative pressure state). When fabrication liquid is not discharged, the maintenance assembly 61 covers the nozzle faces of the heads 52 with the caps 62 to prevent incorporation of powder 20 into nozzles and drying of the fabrication liquid 10.

The fabrication unit 5 includes a slider portion 72 slidably supported on a guide 71 above a base 7. The entire fabrication unit 5 is reciprocally movable in the Y direction perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described.

The powder chamber 11 has a box shape and includes two chambers, the supply chamber 21 and the fabrication chamber 22, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

As illustrated in FIG. 5, a powder falling groove 29 is disposed at the periphery of the powder chamber 11 and has a recessed shape with the upper side thereof being open. A surplus of the powder 20 supplied with the flattening roller 12 in formation of a powder layer 31 falls to the powder falling portion 29. Surplus powder 20 having fallen to the powder falling groove 29 is returned to a powder supplier 554 that supplies powder to the supply chamber 21.

Figure 6:
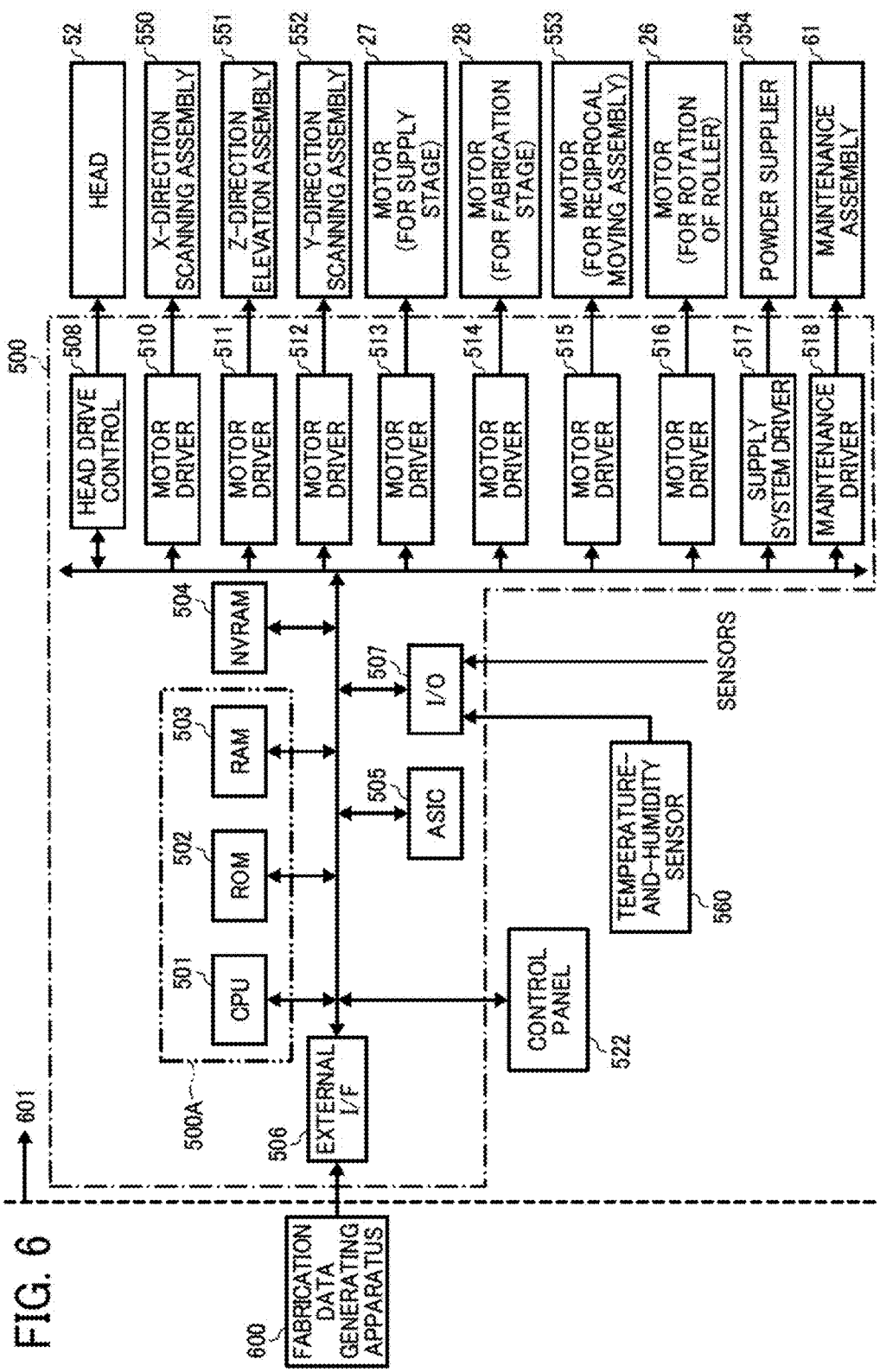
FIG. 6 is a block diagram of a controller of the three-dimensional fabricating apparatus.

The powder supplier 554 illustrated in FIG. 6 is disposed above the supply chamber 21. In an initializing operation of fabrication or when the amount of powder in the supply chamber 21 decreases, powder in a tank constituting the powder supplier 554 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and forms a desired thickness of powder layer 31.

The flattening roller 12 is a bar longer than an inside dimension of the fabrication chamber 22 and the supply chamber 21 (that is, a width of a portion to which powder is supplied or stored). The reciprocal moving assembly 25 reciprocally moves the flattening roller 12 in the Y direction (a sub-scanning direction) along the stage surface.

The flattening roller 12, while being rotated by the motor 26, horizontally moves to pass an area above the supply chamber 21 and the fabrication chamber 22 from the outside of the supply chamber 21. Accordingly, the powder 20 is transferred and supplied onto the fabrication chamber 22, and the flattening roller 12 flattens the powder 20 while passing over the fabrication chamber 22, thus forming the powder layer 31.

As illustrated in FIG. 2, a powder removal plate 13 serving as a powder remover to remove the powder 20 attached to the flattening roller 12 is disposed in contact with a circumferential surface of the flattening roller 12.

The powder removal plate 13 moves together with the flattening roller 12 in contact with the circumferential surface of the flattening roller 12. The powder removal plate 13 is arranged in a state in which the powder removal plate 13 counters the flattening roller 12 when the flattening roller 12 rotates in a direction in which the flattening roller 12 rotates to flatten the powder 20.

In this embodiment, the powder chamber 11 of the fabrication section 1 includes two chambers, i.e., the supply chamber 21 and the fabrication chamber 22. In some embodiments, a powder chamber includes only the fabrication chamber 22, and a powder supplier supplies powder to the fabrication chamber 22 and the flattening unit flattens the powder.

Next, an outline of a controller of the three-dimensional fabricating apparatus is described with reference to FIG. 6.

FIG. 6 is a block diagram of a controller of the three-dimensional fabricating apparatus according to an embodiment of this disclosure.

A controller 500 serving as the controller includes a main controller 500A. The main controller 500A includes a central processing unit (CPU) 501, a read-only memory (ROM) 502, a random access memory (RAM) 503, a non-volatile random access memory (NVRAM) 504, and an application-specific integrated circuit (ASIC) 505. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation which includes control according to embodiments of the present disclosure. The RAM 503 temporarily stores fabrication data and other data.

The NVRAM 504 retains data even when the apparatus is powered off. The ASIC 505 performs image processing, such as processing of various signals on image data, and processes input and output signals to control the entire apparatus.

The controller 500 also includes an interface (I/F) 506 to send and receive data and signals used in receiving fabrication data from an external fabrication data generating apparatus 600. The fabrication data generating apparatus 600 generates fabrication data in which a final-form object is sliced in multiple fabrication layers, and is constituted of an information processing apparatus, such as a personal computer.

The controller 500 includes an input-output (I/O) unit to receive detection signals of various sensors.

The controller 500 includes a head drive controller 508 to control driving of each head 52 of the liquid discharge unit 50.

The controller 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the Y direction(the sub-scanning direction).

The controller 500 includes a motor driver 511 to drive a motor constituting the Z-direction elevation assembly 551 to move (elevate) the carriage 51 of the liquid discharge unit 50 upward and downward in the Z direction. Note that the entire fabrication unit 5 may be elevated in the direction indicated by arrow Z.

The controller 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The controller 500 includes a motor driver 515 and a motor driver 516. The motor driver 515 drives a motor 553 of the reciprocal moving assembly 25 to move the flattening roller 12. The motor driver 516 includes the motor 26 to rotate the flattening roller 12.

The controller 500 includes a supply system driver 517 and a maintenance driver 518. The supply system driver 517 drives the powder supplier 554 to supply powder 20 to the supply chamber 21. The maintenance driver 518 drives the maintenance assembly 61 of the liquid discharge unit 50.

The I/O unit 507 receives detection signals from, e.g., a temperature-and-humidity sensor 560 to detect temperature and humidity as environmental conditions of the apparatus and detection signals from other sensors.

The controller 500 is connected to a control panel 522 for inputting and displaying information necessary to the three-dimensional fabricating apparatus 601.

Note that the fabrication data generating apparatus 600 and the three-dimensional fabricating apparatus (powder lamination fabrication apparatus) 601 constitutes a three-dimensional fabrication system according to an embodiment of the present disclosure.

Next, a flow of fabrication steps is described with reference to FIGS. 7A through 7E. FIGS. 7A through 7E are schematic illustration of the flow of fabrication steps.

First, a description is given of a state in which a first fabrication layer 30 is formed on the fabrication stage 24 of the fabrication chamber 22.

Figure 7A:
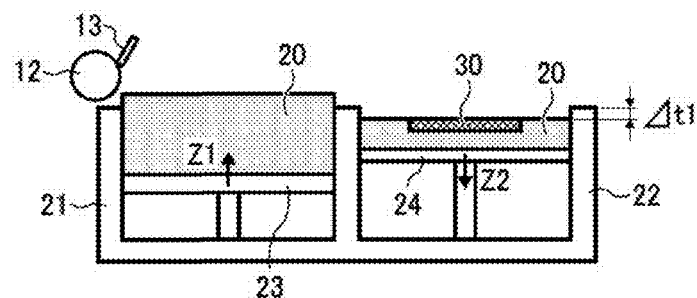
FIGS. 7A through 7E are cross-sectional views of the fabrication section at fabrication steps.

When a second fabrication layer 30 is formed on the first fabrication layer 30, as illustrated in FIG. 7A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between an upper surface (a surface of a powder layer) of the fabrication chamber 22 and a lower portion (lower tangential portion) of the flattening roller 12 is Δt1. The distance Δt1 corresponds to the thickness of the powder layer 31 to be formed next. The distance Δt1 is preferably about several tens μm to about 300 μm.

Figure 7B:
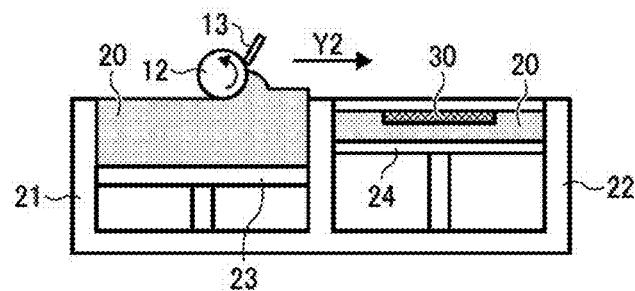

Next, as illustrated in FIG. 7B, by moving the flattening roller 12 in a direction indicated by arrow Y2 toward the fabrication chamber 22 while rotating the flattening roller 12 in a forward direction (indicated by arrow R), powder 20 upper than the level of a top face of the supply chamber 21 is transferred and supplied to the fabrication chamber 22 (powder supply).

Figure 7C:
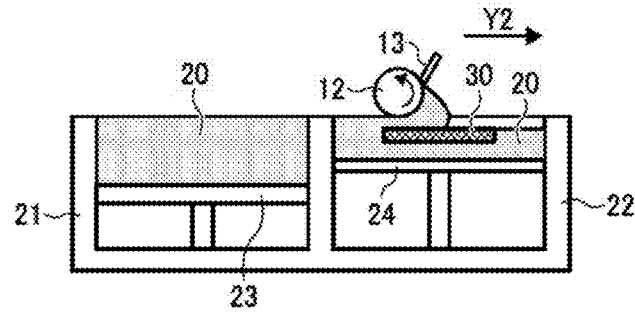
Figure 7D:
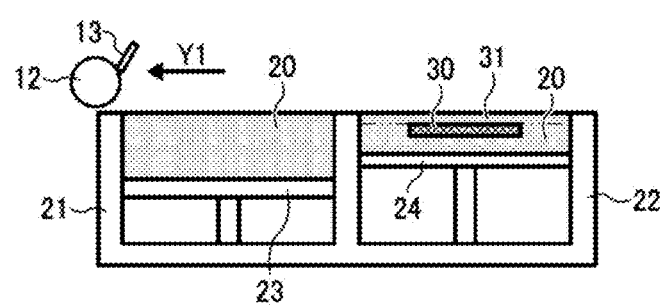

As illustrated in FIG. 7C, the flattening roller 12 is moved in parallel to the stage surface of the fabrication stage 24 of the fabrication chamber 22. As illustrated in FIG. 7D, a powder layer 31 having a thickness of Δt1 is formed on the fabrication layer 30 of the fabrication stage 24 (flattening). After the powder layer 31 is formed, as illustrated in FIG. 7D, the flattening roller 12 is moved in the direction indicated by arrow Y1 and returned to an initial position.

Here, the flattening roller 12 is movable while maintaining a constant distance between the fabrication chamber 22 and the level of the top face of the supply chamber 21. Such a configuration allows formation of a uniform thickness Δt1 of the powder layer 31 on the fabrication chamber 22 or the fabrication layer 30 already formed while transporting the powder 20 to an area above the fabrication chamber 22 with the flattening roller 12.

Figure 7E:
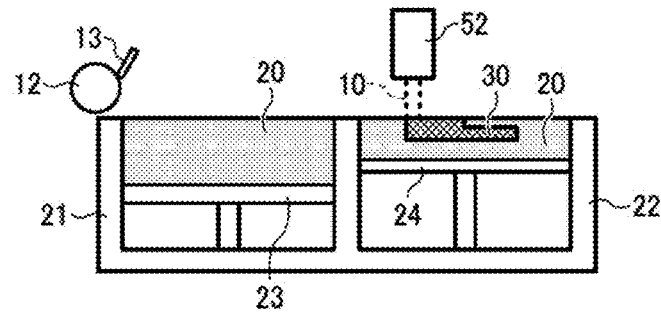

Then, as illustrated in FIG. 7E, droplets of fabrication liquid 10 are discharged from the heads 52 of the liquid discharge unit 50 to form and laminate the next fabrication layer 30 on the powder layer 31 (fabrication).

For the fabrication layer 30, for example, when the fabrication liquid 10 discharged from the head 52 is mixed with the powder 20, adhesives contained in the powder 20 dissolve and bond together. Thus, particles of the powder 20 bind together to form the fabrication layer 30.

Next, the step of forming the powder layer 31 by the above-described powder supply and flattening and the step of discharging the fabrication liquid with the heads 52 are repeated to form a new fabrication layer 30. At this time, a new fabrication layer 30 and the fabrication layer 30 below the new fabrication layer 30 are united to form part of a three-dimensional fabrication object.

Then, the step of forming the powder layer 31 by the powder supply and flattening and the step of discharging the fabrication liquid with the heads 52 are repeated a required number of times to finish the three-dimensional fabrication object (solid fabrication object).

Next, descriptions are given of a powder material (powder) for three-dimensional fabrication and a fabrication liquid used in the three-dimensional fabricating apparatus 601 according to this embodiment of this disclosure. It is to be noted that the powder and fabrication liquid used in a three-dimensional fabricating apparatus according to an embodiment of this disclosure is not limited to the powder and fabrication liquid described below.

The powder material for three-dimensional fabrication includes a base material and a water-soluble organic material that dissolves by action of cross-linker containing water serving as fabrication liquid and turns to be cross-linkable. The base material is coated with the water-soluble organic material at an average thickness of 5 nm to 500 nm.

For the powder material for three-dimensional fabrication, the water-soluble organic material coating the base material dissolves by action of cross-linker containing water and turns to be cross-linkable. When cross-linker containing water is applied to the water-soluble organic material, the water-soluble organic material dissolves and cross-link by action of cross-linkers contained in the cross-linker containing water.

Thus, a thin layer (powder layer) is formed with the powder material for three-dimensional fabrication. When the cross-linker containing water is discharged as the fabrication liquid 10 onto the powder layer, the dissolved water-soluble organic material cross-links in the powder layer. As a result, the powder layer is bonded and hardened, thus forming the fabrication layer 30.

At this time, the coverage of the water-soluble organic material coating the base material is 5 nm to 500 nm in average thickness. When the water-soluble organic material dissolves, only a minimum required amount of the water-soluble organic material is present around the base material. The minimum required amount of water-soluble organic material cross-links and forms a three-dimensional network. Accordingly, the powder layer is hardened at a good dimensional accuracy and strength.

Repeating the operation allows a complex three-dimensional object to be simply and effectively formed at a good dimensional accuracy without losing the shape before sintering.

—Base Material—

The base material is not limited to a specific material as long as the material has a shape of powder or particle. Any powder or particulate material can be selected as the base material according to the purpose. Examples of the material include metal, ceramic, carbon, polymer, wood, and biocompatible material. From a viewpoint of obtaining a relatively high strength of three-dimensional object, for example, metal or ceramic which can be finally sintered is preferable.

Preferable examples of metal include stainless steel (SUS), iron, copper, titan, and silver. An example of SUS is SUS316L.

Examples of ceramic include metal oxide, such as silica ($SiO_2$), alumina ($Al_2O_3$), zirconia ($ZrO_2$), and titania ($TiO_2$).

Examples of carbon include graphite, graphene, carbon nanotube, carbon nanohorn, and fullerene.

An example of polymer is publicly-known water-insoluble resin.

Examples of wood include woodchip and cellulose.

Examples of biocompatible material includes polylactic acid and calcium phosphate.

Of such materials, one material can be solely used or two or more types of materials can be used together.

Note that commercially available particles or powder formed of such materials can be used as the base material. Examples of commercial products include SUS316L (PSS316L made by SANYO SPECIAL STEEL Co., Ltd), $SiO_2$ (Ecserica SE-15 made by Tokuyama Corporation), $ZrO_2$ (TZ-B53 made by Tohsoh Corporation).

To enhance the compatibility with water-soluble organic material, known surface (reforming) treatment may be performed on the base material.

—Water-Soluble Organic Material—

The water-soluble organic material is not limited to a specific material as long as the material dissolves in water and is cross-linkable by action of cross-linker. In other words, if it is water-soluble and water-linkable by action of cross-linker, any material can be selected according to the purpose.

Here, the water solubility of water-soluble organic material means that, when a water-soluble organic material of 1 g is mixed into water 100 g at 30° C. and stirred, not less than 90 mass percentage of the water-soluble organic material dissolves in the water.

As the water-soluble organic material, the viscosity of four mass percentage (w/w %) solution at 20° C. is preferably not greater than 40 mPa·s, more preferably 1 to 35 mPa·s, particularly more 5 to 30 mPa·s.

When the viscosity of the water-soluble organic material is greater than 40 mPa·s, the hardness of a hardened material (three-dimensional object or hardened material for sintering) of the powder material (powder layer) for three-dimensional object formed by applying cross-linker containing water to the powder material for three-dimensional fabrication may be insufficient. As a result, in post-treatment, such as sintering, and handling, the hardened material may lose the shape. In addition, the hardened material may be insufficient in dimensional accuracy.

The viscosity of the water-soluble organic material can be measured in accordance with, for example, JISK117.

—Cross-Linker Containing Water—

The cross-linker containing water serving as fabrication liquid is not limited to any specific liquid as long as the liquid contains cross linker in aqueous medium, and any suitable liquid is selectable according to the purpose. The cross-linker containing water can include any other suitable component as needed in addition to the aqueous medium and the cross-linker.

As such other component, any suitable component is selectable in consideration of conditions, such as the type of an applicator of the cross-linker containing water or the frequency and amount of use. For example, when the cross-linker containing water is applied according to a liquid discharge method, a component can be selected in consideration with influences of clogging to nozzles of the liquid discharge head.

Examples of the aqueous medium include alcohol, ethanol, ether, ketone, and preferably water. The aqueous medium may be water containing a slight amount of other component, such as alcohol, than water.

Using the above-described powder material for three-dimensional object and cross-linker containing water serving as fabrication liquid reduces clogging of nozzles and enhances the durability of the liquid discharge head as compared to a configuration in which the liquid discharge head discharges binder to attach powder (base material).

Figure 8:
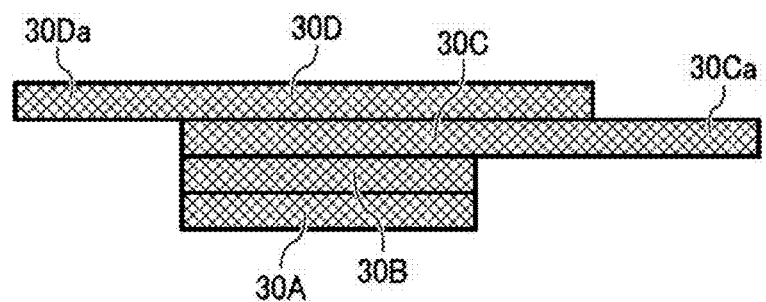
FIG. 8 is an illustration of an example of a three-dimensional object fabricated by a three-dimensional fabricating method according to an embodiment of the present disclosure.
Figure 9:
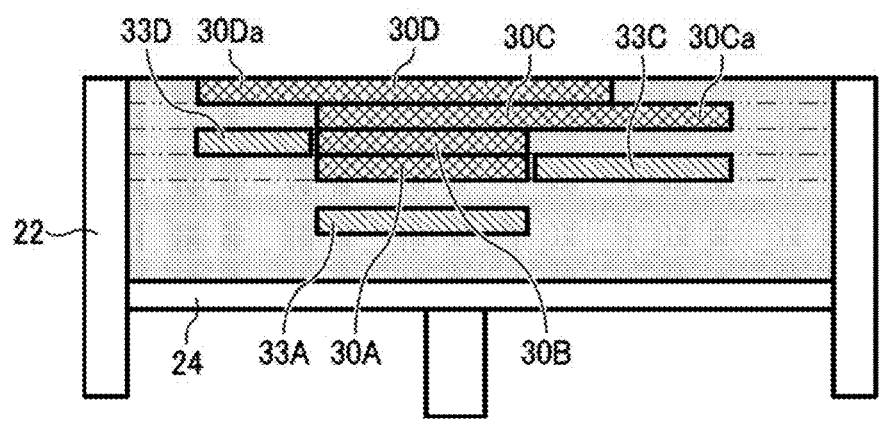
FIG. 9 is an illustration of a state of a fabrication chamber when the three-dimensional object of FIG. 8 is fabricated.

Next, a three-dimensional fabricating method according to an embodiment of this disclosure is described with reference to FIGS. 8 and 9. FIG. 8 is an illustration of an example of a three-dimensional object fabricated by the three-dimensional fabricating method according to this embodiment. FIG. 9 is an illustration of a state of a fabrication chamber when the three-dimensional object of FIG. 8 is fabricated.

In this example, first, as illustrated in FIG. 8, fabrication layers 30A, 30B, 30C, and 30D are laminated in this order from a lower side to form a three-dimensional object 300. Note that, in FIG. 8, a cross section along the Y direction is illustrated, and the fabrication layers 30A, 30B, 30C, and 30D are assumed to have the same width in the X direction for simplicity.

In fabrication of the three-dimensional object 300, when the first fabrication layer 30A as the lowest layer is fabricated, a lower surface of an entire fabrication area of the first fabrication layer 30A contacts powder 20.

The second fabrication layer 30B entirely overlaps the first fabrication layer 30A in a direction of lamination of the fabrication layers 30. In other words, when the second fabrication layer 30B is projected onto the first fabrication layer 30A adjacent to the second fabrication layer 30B in the direction of lamination, the second fabrication layer 30B is entirely included in the first fabrication layer 30A. Accordingly, the lower surface of the fabrication area of the second fabrication layer 30B has no area contacting the powder 20.

A lower surface of a fabrication area of the third fabrication layer 30C overlapping the second fabrication layer 30B in the direction of lamination does not contact the powder 20. However, a lower surface of a fabrication area 30Ca of the third fabrication layer 30C not overlapping the second fabrication layer 30B in the direction of lamination contacts the powder 20.

A lower surface of a fabrication area of the fourth fabrication layer 30D overlapping the third fabrication layer 30C in the direction of lamination does not contact the powder 20. However, a lower surface of a fabrication area 30Da of the fourth fabrication layer 30D not overlapping the third fabrication layer 30C in the direction of lamination contacts the powder 20.

Hence, in this embodiment, as illustrated in FIG. 9, a sacrificial fabrication object (referred to as "sacrificial layer") separable from the three-dimensional object 300 via powder 20 is formed below the first fabrication layer 30A.

Likewise, a sacrificial layer 33C separable from the three-dimensional object 300 via powder 20 is formed below the fabrication area 30Ca of the third fabrication layer 30C.

Likewise, a sacrificial layer 33D separable from the three-dimensional object 300 via powder 20 is formed below the fabrication area 30Da of the fourth fabrication layer 30D.

As described above, when the lower surfaces of the fabrication areas of the fabrication layers 30 being a layered fabrication object are formed in contact with powder 20, the sacrificial layers 33 (33A through 33D) as sacrificial fabrication objects separable from the three-dimensional object 300 via the powder 20 are formed below the fabrication areas having the lower surfaces contacting the powder 20.

Next, fabrication steps of the three-dimensional object of FIG. 8 is described with reference to FIGS. 10A through 12C. FIGS. 10A through 12C are illustrations of the fabrication chamber in the fabrication steps. Portions relating to powder supply and discharging of fabrication liquid are partially omitted.

Figure 10A:
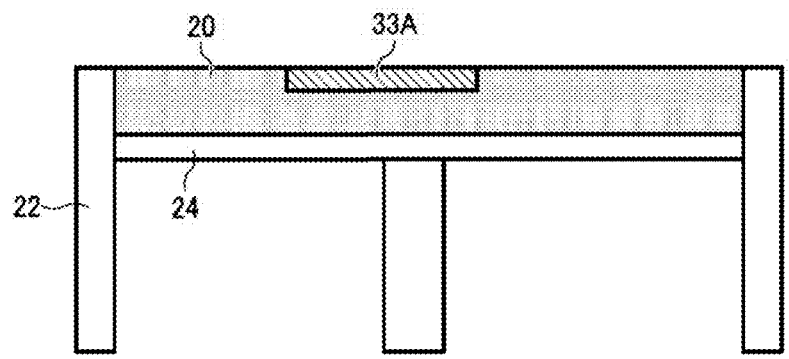
FIGS. 10A through 10C are illustrations of a fabrication chamber in fabrication steps of the three-dimensional object of FIG. 8.

First, as illustrated in FIG. 10A, with the fabrication chamber 22 filled with powder 20, fabrication liquid is discharged to form (fabricate) a sacrificial layer 33A.

Figure 10B:
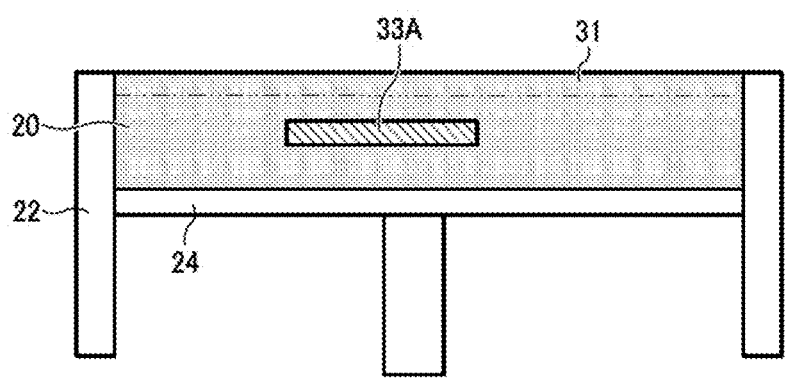

Then, as illustrated in FIG. 10B, the fabrication stage 24 moves downward, and powder 20 is supplied onto the sacrificial layer 33A and flattened to form a powder layer 31 in which a first fabrication layer 30A is to be formed. At this time, powder 20 interposes between the sacrificial layer 33A and the powder layer 31 in which a first fabrication layer 30A is to be formed.

Figure 10C:
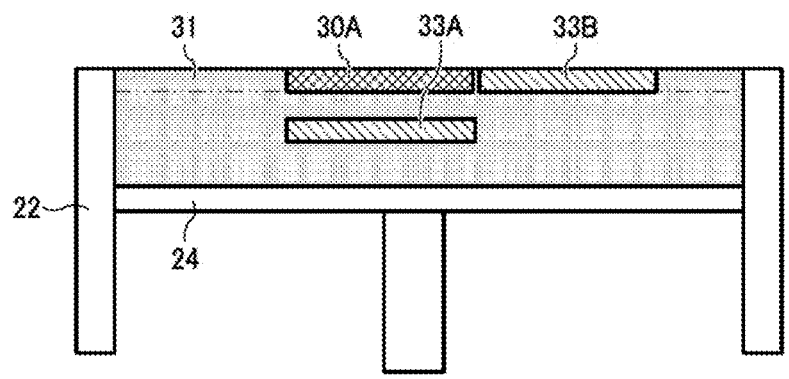

As illustrated in FIG. 10C, fabrication liquid is discharged to form both the first fabrication layer 30A and a sacrificial layer 33C to be disposed below a fabrication area 30Ca of a third fabrication layer 30C. At this time, the sacrificial layer 33A is disposed below the first fabrication layer 30A via the powder 20.

Figure 11A:
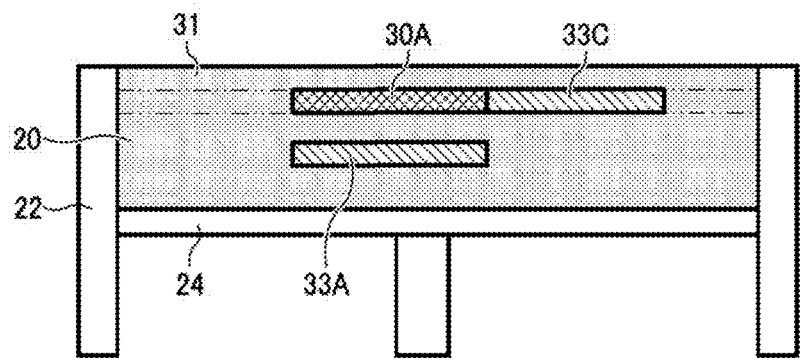
FIGS. 11A through 11C are illustrations of the fabrication chamber in fabrication steps following the fabrication steps of FIGS. 10A through 10C.

Then, as illustrated in FIG. 11A, the fabrication stage 24 moves downward, and powder 20 is supplied onto the first fabrication layer 30A and the sacrificial layer 33C and flattened to form a powder layer 31 in which a second fabrication layer 30B is to be formed.

Figure 11B:
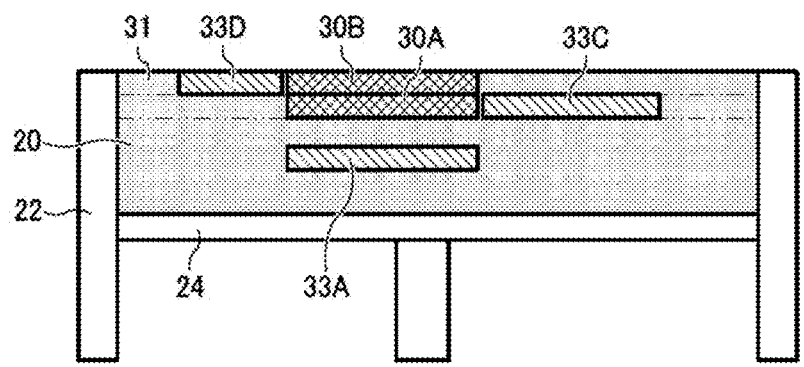

As illustrated in FIG. 11B, fabrication liquid is discharged to form both the second fabrication layer 30B and a sacrificial layer 33D to be disposed below a fabrication area 30Da of a fourth fabrication layer 30D.

Figure 11C:
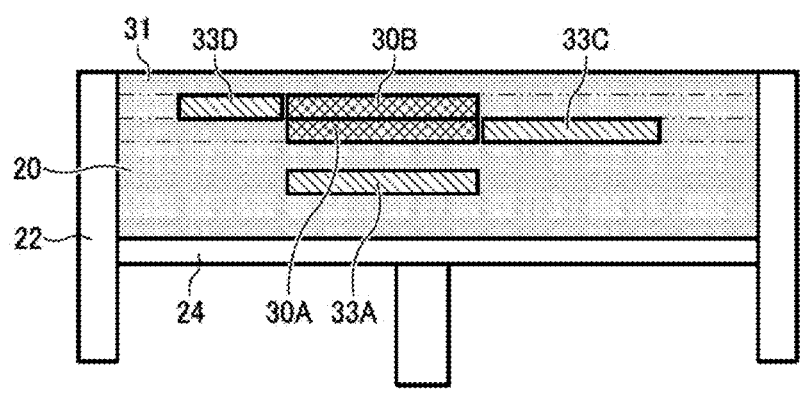

Then, as illustrated in FIG. 11C, the fabrication stage 24 moves downward, and powder 20 is supplied onto the second fabrication layer 30B and the sacrificial layer 33D and flattened to form a powder layer 31 in which a third fabrication layer 30C is to be formed.

Figure 12A:
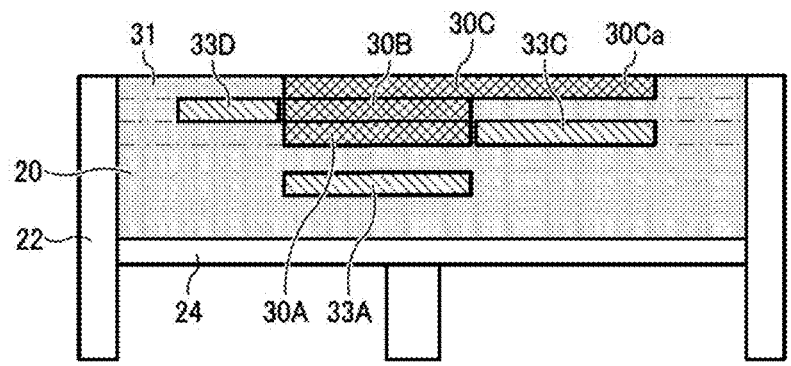
FIGS. 12A through 12C are illustrations of the fabrication chamber in fabrication steps following the fabrication steps of FIGS. 11A through 11C.

As illustrated in FIG. 12A, fabrication liquid is discharged to form the third fabrication layer 30C. At this time, the sacrificial layer 33C is disposed below the fabrication area 30Ca of the third fabrication layer 30C via the powder 20.

Figure 12B:
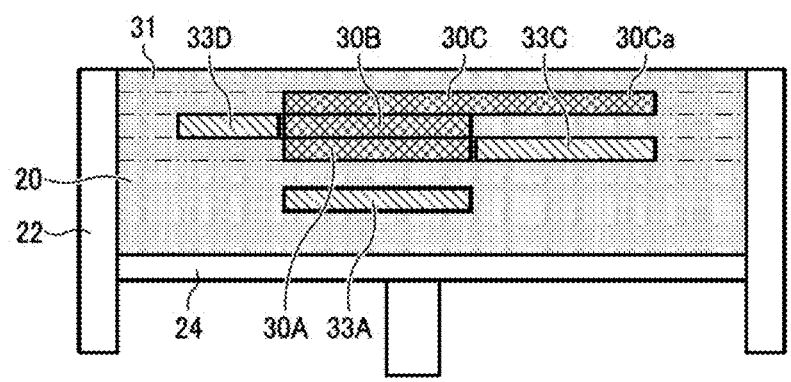

Then, as illustrated in FIG. 12B, the fabrication stage 24 moves downward, and powder 20 is supplied onto the third fabrication layer 30C and flattened to form a powder layer 31 in which a fourth fabrication layer 30D is to be formed.

Figure 12C:
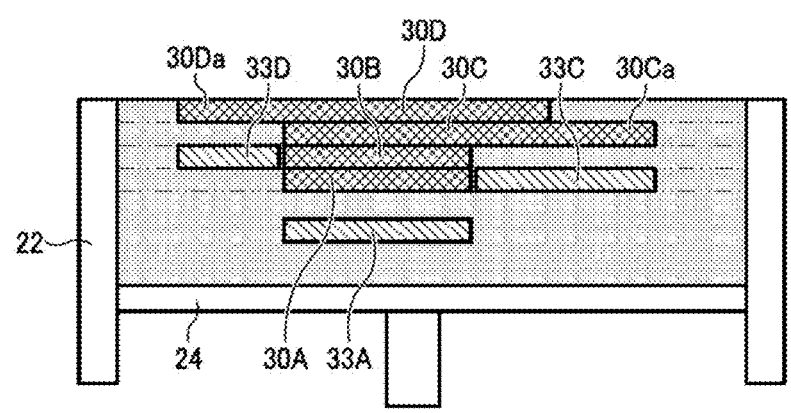

As illustrated in FIG. 12C, fabrication liquid is discharged to form the fourth fabrication layer 30D. At this time, the sacrificial layer 33D is disposed below the fabrication area 30Da of the fourth fabrication layer 30D via the powder 20.

As described above, the sacrificial layers are disposed via powder below the fabrication areas in which the lower surfaces of the fabrication layers are formed in contact with the powder. Such a configuration increases the friction force of powder interposed between the sacrificial layers and the fabrication layers, thus reducing aggregation of powder in forming a fabrication layer on a powder layer on powder on the sacrificial layer.

Accordingly, a reduction in flatness due to aggregation of powder is suppressed, thus enhancing the flatness of the lower surface of the three-dimensional object.

This example assumes that the thickness of the sacrificial layer 33 is the same as the thickness of the powder layer 31. However, the thickness of the sacrificial layer 33 may be smaller than the thickness of the first fabrication layer 30 (the thickness of the powder layer 31). In other words, the amount of discharge of fabrication liquid per unit of area in forming a sacrificial fabrication object (sacrificial layer) may be smaller than the amount of discharge of fabrication liquid per unit of area in forming a layered fabrication object (fabrication layer).

Such a configuration reduces the consumption of fabrication liquid used to fabricate the sacrificial layers 33, thus reducing the waste of fabrication liquid.

Figure 13:
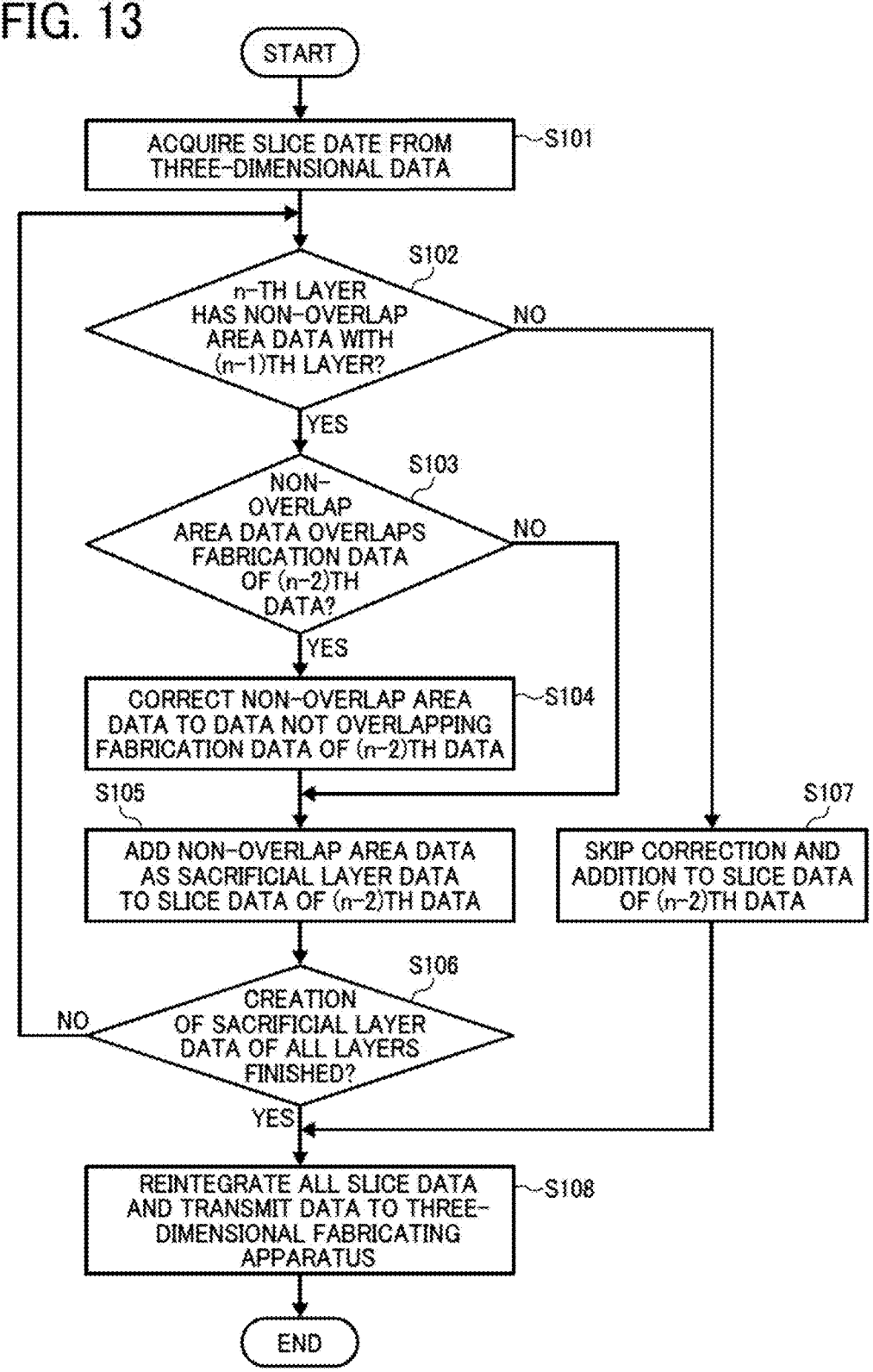
FIG. 13 is a flow chart of a first example of processing of creating fabrication data by a client computer of a fabrication data creation device executed based on a program according to an embodiment of the present disclosure.

Next, a first example of processing of creating fabrication data by a client computer of a fabrication data creation device executed according to a program is described with reference to FIG. 13.

First, at S101, the computer acquires slice data for forming each fabrication layer corresponding to a predetermined lamination pitch (the thickness $\Delta t1$ of the powder layer 31) based on target three-dimensional data. Here, data of each fabrication layer included in the slice data is referred to as fabrication data.

At S102, the computer compares slice data between a nth layer and a (n-1)th layer and determines whether the nth layer has a fabrication area not overlapping with the (n-1)th layer, that is, a fabrication area having a lower surface contacting powder (this region referred to as "non-overlap area" or "overhang portion").

Note that, when the nth layer is a lowest layer (a first layer), the (n-1)th layer does not exist. Therefore, processing is executed assuming that there is non-overlap area.

At S103, when the nth layer has a non-overlap area, the computer determines whether fabrication data (non-overlap area data) on the non-overlap area of the nth layer has a portion overlapping with fabrication data of the (n-2)th layer in the direction of lamination.

At this time, when the non-overlap area data of the nth layer has a portion overlapping with the fabrication data of the (n-2)th layer in the direction of lamination, at S104 the computer corrects the non-overlap area data of the nth layer into data not overlapping the fabrication data of the (n-2)th layer.

Then, when the non-overlap area data of the nth layer has no portion overlapping with the fabrication data of the (n-2)th layer in the direction of lamination, at S105 the computer adds the non-overlap area data of the nth layer to the slice data of the (n-2)th layer, as sacrificial layer data for fabricating a sacrificial layer.

Note that, as described above, when the nth layer is a lowest layer (a first layer), the (n-1)th layer and the (n-2)th layer do not exist. The fabrication data of the nth layer is non-overlap area data and is used as sacrificial layer data.

Accordingly, the fabrication data of the nth layer is located as sacrificial layer data at a position corresponding to the (n-2)th layer below the fabrication data of the nth layer, and slice data for forming a powder layer is added to a position corresponding to the (n-1)th layer.

At S106, the computer checks whether sacrificial layer data has been created for all layers.

By contrast, when the nth layer has no non-overlap area, at S107 the computer skips the correction of and addition to slice data of the (n-2)th layer.

At S108, the computer reintegrates all slice data and transmit reintegrated data to the three-dimensional fabricating apparatus 601.

As described above, when slice data of a (n-1)th layer is overlapped with slice data of a nth layer and the fabrication area of the nth layer has a non-overlap area with the (n-1)th layer, the computer adds data of the non-overlap area, as sacrificial layer data, to slice data of the (n-2)th layer.

At this time, the non-overlap area data is not directly added as the sacrificial layer data but is added after being corrected to have a margin between the non-overlap area data and the fabrication data on the (n-2)th layer. Thus, the sacrificial layer 33 is formed away from the fabrication layer 30 in the direction perpendicular to the direction of lamination.

Further, by adding the non-overlap area data to the (n-2)th layer as the sacrificial layer data so as not to overlap adjacent fabrication data in the direction of lamination, a gap is formed between the sacrificial layer and the non-overlap area by a lamination pitch.

When the non-overlap area data overlaps with the fabrication data on the (n-2)th layer, the computer deletes or corrects data of a portion overlapping with fabrication data and uses the deleted or corrected non-overlap area data as the sacrificial layer data.

Accordingly, the sacrificial layer is fabricated at predetermined gaps away from a fabrication object in all the X, Y, and Z directions.

For this embodiment, the sacrificial layer is away from the fabrication layer by the pitch of one powder layer in the direction of lamination. However, in some embodiments, the sacrificial layer may be away from the fabrication layer by the pitch of two or more powder layers in the direction of lamination. However, to prevent excessive aggregation of powder, the pitch of one powder layer is more effective.

Next, another example of a method of adding sacrificial layer data is described with reference to FIGS. 14 and 15.

Figure 14:
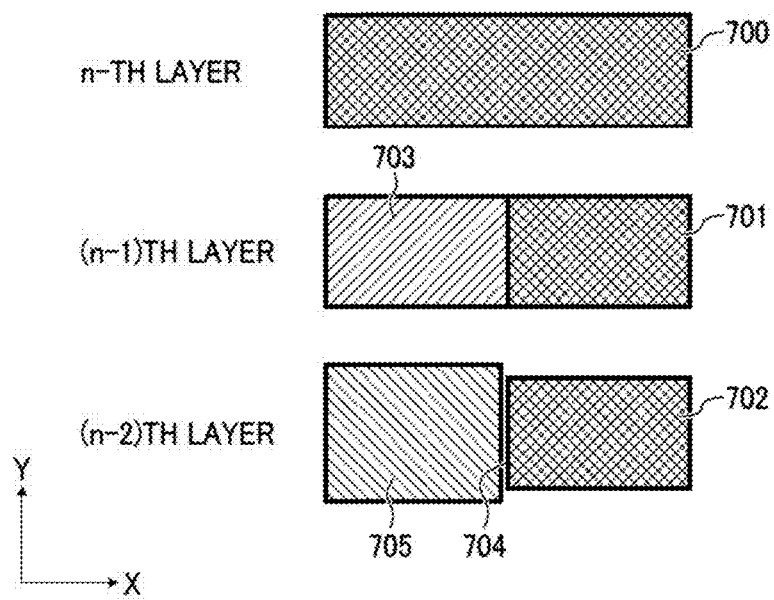
FIG. 14 is an illustration of a first example of a method of adding sacrificial layer data.

In an example illustrated in FIG. 14, nth-layer fabrication data 700, (n-1)th-layer fabrication data 701, (n-2)th-layer fabrication data 702 are laminated one on another. Here, the (n-1)th-layer fabrication data 701 and the (n-2)th-layer fabrication data 702 are the same, and the nth-layer fabrication data 700 is larger than the (n-1)th-layer fabrication data 701 in the X direction.

Accordingly, the nth-layer fabrication data 700 includes non-overlap area data 703 illustrated in FIG. 14 together with the (n-1)th-layer fabrication data 701.

If the non-overlap area data 703 is added to the (n-2)th layer as sacrificial layer data, the fabrication layer and the sacrificial layer of the (n-2)th layer would be integrated.

Hence, the non-overlap area data 703 is corrected to have a margin 704 from the (n-2)th-layer fabrication data 702 in the X direction.

The non-overlap area data 703 is also corrected to have a greater width than the fabrication data on the (n-2)th layer in the Y direction. Such a configuration facilitates discrimination of the sacrificial layer from the fabrication layer constituting a three-dimensional object.

The non-overlap area data 703 thus corrected is added as sacrificial layer data 705 to slice data of the (n-2)th layer.

Figure 15:
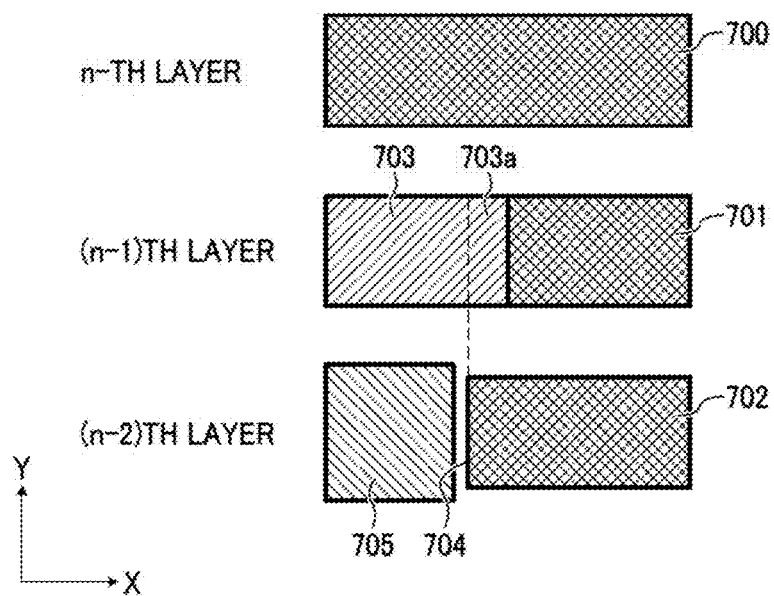
FIG. 15 is an illustration of a second example of the method of adding sacrificial layer data.

In another example illustrated in FIG. 15, nth-layer fabrication data 700, (n-1)th-layer fabrication data 701, (n-2)th-layer fabrication data 702 are laminated one on another. Here, the (n-1)th-layer fabrication data 701 is smaller than the (n-2)th-layer fabrication data 702 in the X direction, and the nth-layer fabrication data 700 is larger than the (n-1)th-layer fabrication data 701 in the X direction.

Accordingly, the nth-layer fabrication data 700 includes non-overlap area data 703 illustrated in FIG. 15 together with the (n-1)th-layer fabrication data 701.

Area data 703*a* in the non-overlap area data 703 overlaps with the (n-2)th-layer fabrication data 702 in the direction of lamination. Therefore, if the non-overlap area data 703 is added to the (n-2)th layer as sacrificial layer data, the fabrication layer and the sacrificial layer of the (n-2)th layer would be integrated.

Hence, the area data 703a of the non-overlap area data 703 is deleted, and is also corrected to have a margin 704 from the (n-2)th-layer fabrication data 702 in the X direction.

The non-overlap area data 703 is also corrected to have a greater width than the fabrication data on the (n-2)th layer in the Y direction.

The non-overlap area data 703 thus corrected is added as sacrificial layer data 705 to slice data of the (n-2)th layer.

Figure 16A:
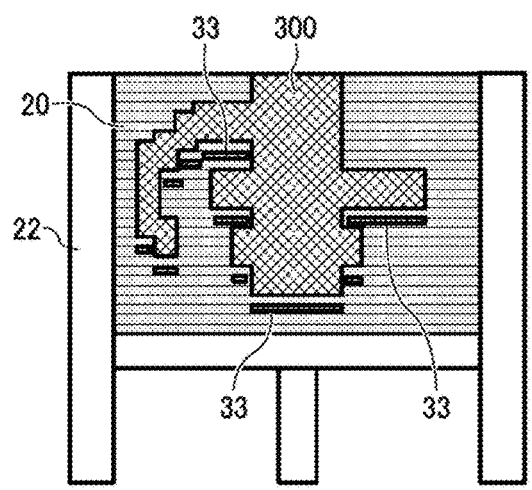
FIGS. 16A and 16B are illustrations of a method of removing powder from a three-dimensional object fabricated by a three-dimensional fabricating method according to an embodiment of the present disclosure.
Figure 16B:
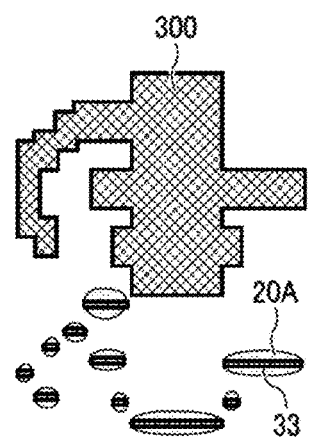
Figure 17A:
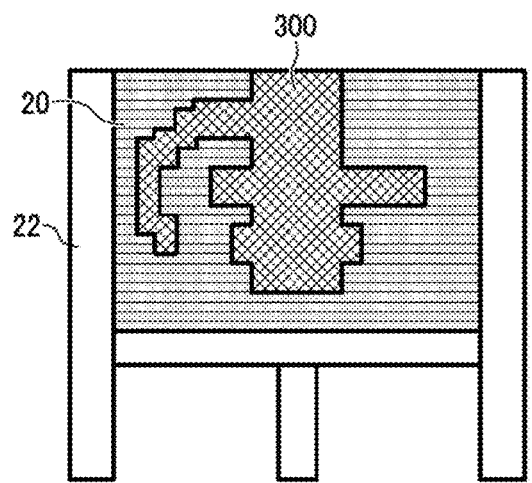
FIGS. 17A and 17B are illustrations of a method of removing powder from a three-dimensional object fabricated by a three-dimensional fabricating method according to a comparative example of the present disclosure.
Figure 17B:
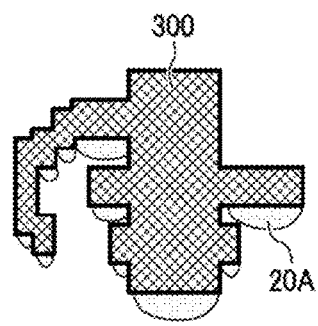

Next, a method of removing powder from a three-dimensional object according to an embodiment of this disclosure is described with reference to FIGS. 16A and 16B and 17A and 17B. FIGS. 16A and 16B are illustrations of a method of removing powder from a three-dimensional object fabricated by a three-dimensional fabricating method according to an embodiment of this disclosure. FIGS. 17A and 17B are illustrations of a method of removing powder from a three-dimensional object fabricated by a three-dimensional fabricating method according to a comparative example.

For the comparative example, as illustrated in FIG. 17A, a three-dimensional object 300 is fabricated without forming any sacrificial layer.

Here, when fabrication liquid is discharged and adhered to a powder layer for lamination, the fabrication liquid permeates in all X, Y, and Z directions. When fabrication liquid is discharged to the nth layer with the (n-1)th layer having no fabrication layer (no area to which the fabrication liquid adheres), liquid bridging force intensively acts, rather than adhesion force or friction coefficient of between powder particles, thus aggregating powder.

As more fabrication layers are laminated, fabrication liquid permeates while moving within a fabrication layer. Accordingly, powder 20 on a lower surface of the fabrication layer adheres to a three-dimensional object 300 with the fabrication liquid exuded from the lower surface. As illustrated in FIG. 17B, the three-dimensional object 300 is taken out with surplus powder 20A adhering to the three-dimensional object 300.

Accordingly, the lower surface of the three-dimensional object 300 has a lower flatness due to aggregation of powder than an upper surface or a side face of the three-dimensional object 300. It takes longer time to remove surplus powder from the lower surface of the three-dimensional object 300 after the end of fabrication.

By contrast, for this embodiment of the present disclosure, as illustrated in FIG. 16A, a three-dimensional object 300 is fabricated while forming sacrificial layers 33.

In other words, as described above, when fabrication liquid is discharged with the (n-1)th layer having no fabrication layer, the (n-2)th layer is fabricated so as to have a sacrificial layer 33 with a fabrication layer constituting the three-dimensional object 300.

When fabrication liquid is discharged to the nth layer with the (n-2)th layer having the sacrificial layer 33, friction force increases between powder of the (n-1)th layer and the sacrificial layer 33 of the (n-2)th layer. Accordingly, powder of the (n-1)th layer becomes unlikely to move, thus reducing aggregation of powder due to liquid bridging force.

As more fabrication layers are laminated, fabrication liquid permeates while moving within a fabrication layer. Accordingly, fabrication liquid exudes onto powder 20 of the (n-1)th layer. However, the amount of fabrication liquid per unit of volume of the powder 20 is smaller than the amount of fabrication liquid discharged and adhered, thus reducing the bonding force between the fabrication layer and the sacrificial layer.

Accordingly, though the three-dimensional object 300 is taken out with surplus powder 20A adhered to the lower surface of the three-dimensional object 300, the surplus powder 20A is peeled off from the three-dimensional object 300, together with the sacrificial layer 33.

Such a configuration increases the flatness of the lower surface of the three-dimensional object 300 than the comparative example. After the end of fabrication, surplus powder 20A is peeled and removed together with the sacrificial layer 33, thus allowing simple removal of the surplus powder 20A from the three-dimensional object 300.

Figure 18:
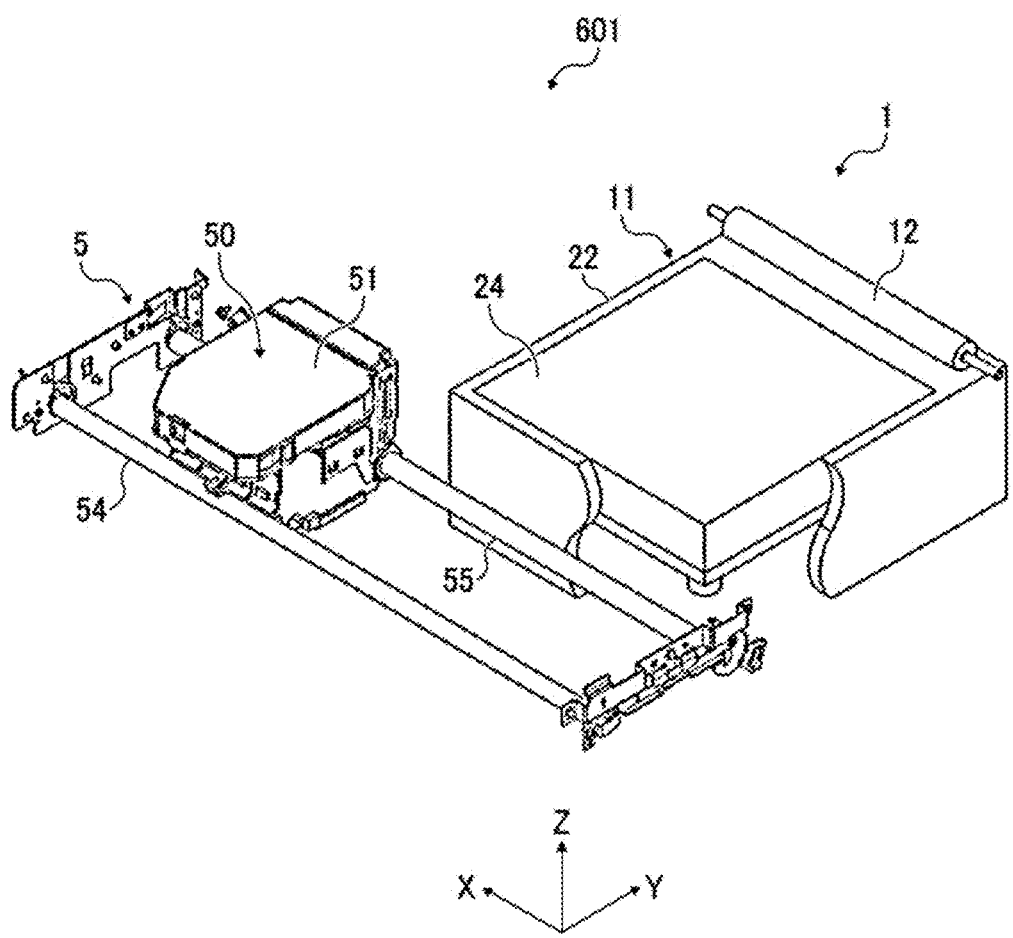
FIG. 18 is a perspective view of a three-dimensional fabricating apparatus according to a second embodiment of the present disclosure.
Figure 19A:
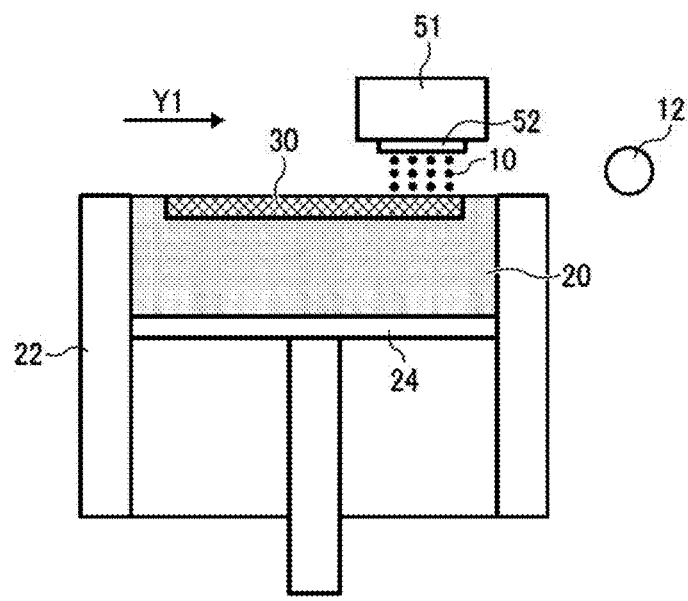
FIGS. 19A and 19B are cross-sectional views of a fabrication section of the three-dimensional fabricating apparatus and fabrications steps.
Figure 19B:
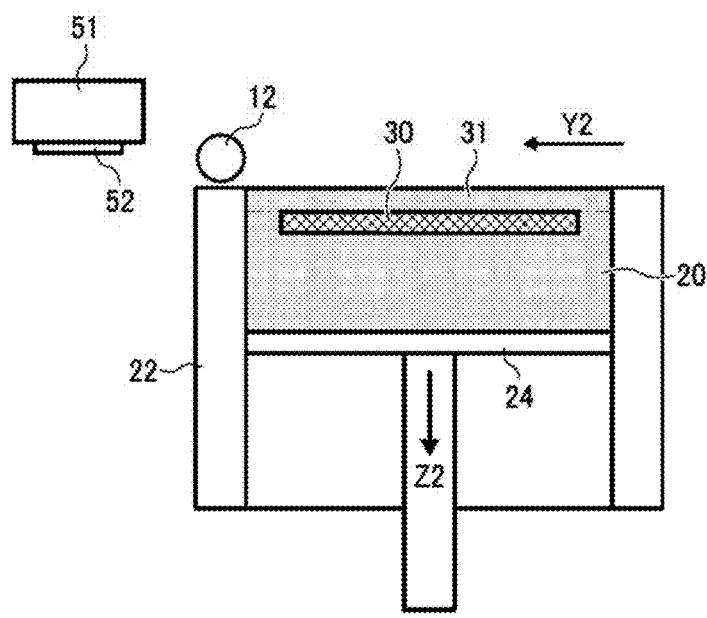

Next, a three-dimensional fabricating apparatus according to a second embodiment of this disclosure is described with reference to FIGS. 18 and 19A and 19B. FIG. 18 is a plan view of the three-dimensional fabricating apparatus according to the first embodiment of the present disclosure. FIGS. 19A and 19B are cross-sectional views of a fabrication section of the three-dimensional fabricating apparatus and fabrications steps.

In this embodiment, a three-dimensional fabricating apparatus 601 is a powder lamination fabricating apparatus. Like the three-dimensional fabricating apparatus according to the above-described first embodiment, the three-dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates a three-dimensional object by discharging fabrication liquid 10 onto a powder layer 31 that is overlaid in layers in the fabrication section 1.

The fabrication section 1 include only a fabrication chamber 22 and supplies powder from a powder supplier to the fabrication chamber 22.

In the fabrication unit 5, a liquid discharge unit 50 is supported by guides 54 and 55 so as to be reciprocally movable along the X direction (main scanning direction).

Note that the other configurations are similar to, even if not the same as, those of the three-dimensional fabricating apparatus 601 according to the first embodiment of this disclosure.

For the three-dimensional fabricating apparatus 601, as illustrated in FIG. 19A, a head 52 of the liquid discharge unit 50 discharges droplets of fabrication liquid 10 onto the powder 20 supplied on a fabrication stage 24 of the fabrication chamber 22, to form a fabrication layer 30.

At this time, while moving the liquid discharge unit 50 in the X direction to perform fabrication for one scan (one scanning area), powder 20 is supplied from a post powder supply 80 onto at least an area to which the fabrication liquid 10 adheres.

Then, the fabrication unit 5 shifts by a distance corresponding to one scan in the sub-scanning direction indicted by arrow Y1 in FIG. 19A, and repeats fabrication of the next one scanning area to fabricate a first fabrication layer 30. Note that, as illustrated in FIG. 19B, a carriage 51 of the fabrication unit 5 is returned to an upstream side in the sub-scanning direction Y1 after fabrication of the first fabrication layer 30.

Then, to form the next fabrication layer 30 on the first fabrication layer 30, the fabrication stage 24 of the fabrication chamber 22 moves downward in a direction indicated by Z2 in FIG. 19B by a thickness of one layer.

Next, as illustrated in FIG. 23B, powder 20 is supplied from the powder supplier to the fabrication chamber 22. The flattening roller 12, while being rotated, is moved in a direction indicated by Y2 in FIG. 19B in parallel to the stage surface of the fabrication stage 24 of the fabrication chamber 22, and a powder layer 31 having a predetermined thickness is formed on the fabrication layer 30 of the fabrication stage 24 (flattening).

The head 52 of the liquid discharge unit 50 discharges droplets of fabrication liquid 10 to form the next fabrication layer 30.

As described above, by repeating formation of the powder layer 31 and solidification of the powder 20 by discharge of the fabrication liquid 10, fabrication layers 30 are laminated in turn to fabricate a three-dimensional object.

A three-dimensional fabricating method according to an embodiment of the present disclosure is also applicable to formation of a three-dimensional object with the three-dimensional fabricating apparatus 601 according to the second embodiment. Thus, fabrication layers are formed in a state in which sacrificial layers are formed by interposing powder 20 below fabrication areas having lower surfaces contacting powder layers.

Next, a second example of processing of creating fabrication data by a client computer of a fabrication data creation device executed according to a program is described with reference to FIG. 20.

At S201, the computer acquires slice data for forming each fabrication layer corresponding to a predetermined lamination pitch (the thickness Δt1 of the powder layer 31) based on target three-dimensional data. Here, data of each fabrication layer included in the slice data is referred to as fabrication data.

First, the computer compares slice data between the nth layer and the (n-1)th layer, which are two continuous layers in the direction of lamination. At S202, the computer determines whether the upper nth layer has a fabrication area not overlapping with the lower (n-1)th layer, that is, a fabrication area having a lower surface contacting powder (this region referred to as "overhang portion" in this example), which is a fabrication area below which no fabrication layer of the (n-1)th layer exists.

Here, when the nth layer has the overhang portion, the computer extracts fabrication data (overhang portion data) of the overhang area of the nth layer. At S203, the computer determines whether the overhang portion data thus extracted overlaps with a portion of fabrication data of the (n-m)th layer (where 2≤m≤k, and m and k are predetermined integers of two ore more).

At this time, when the overhang portion data of the nth layer does not overlap with a portion of fabrication data of the (n-m)th layer, at S207 the computer adds sacrificial layer data for fabricating a sacrificial layer to slice data of from the (n-k)th layer to the (n-2)th layer.

By contrast, when the overhang portion data of the nth layer overlaps with a portion of fabrication data of the (n-m)th layer, at S204 the computer corrects the overhang portion data so that the overhang portion data does not overlap with the fabrication data of the (n-m)th layer.

At S205, the computer determines whether the overhang portion data of the (n-m)th layer corrected at S204 overlaps with a portion of fabrication data of the (n-m-1)th layer in the direction of lamination.

At this time, when the overhang portion data of the (n-m)th layer corrected at S204 does not overlap with a portion of fabrication data of the (n-m-1)th layer, at S207 the computer adds sacrificial layer data for fabricating a sacrificial layer to slice data of from the (n-k)th layer to the (n-2)th layer.

By contrast, when the overhang portion data of the (n-m)th layer corrected at S204 overlaps with a portion of fabrication data of the (n-m-1)th layer, at S206 the computer corrects the overhang portion data so that the overhang portion data of the (n-m)th layer corrected at S204 does not overlap with the fabrication data of the (n-m-1)th layer.

In other words, the computer adds the overhang portion data, as sacrificial layer data, to data of a plurality of continuous layers away from a layer, from which the overhang portion is extracted, downward by two or more layers, and corrects the added sacrificial layer data so that the added sacrificial layer does not overlap with fabrication data of a fabrication layer disposed below and contacting each of the plurality of continuous layers. Note that, like the above-described first example, the computer may add the overhang portion data, as sacrificial layer data, to data of a single layer away from the layer, from which the overhang portion is extracted, downward by two layers.

At S207, the computer adds the sacrificial layer data for fabricating the sacrificial layer to slice data of each of the (n-k)th through (n-2) layers.

By contrast, when the nth layer has no overhang portion, at S208 the computer skips the correction of or addition to slice data of each of the (n-k)th through (n-2) layers.

At S209, the computer reintegrates all slice data and transmit reintegrated data to the three-dimensional fabricating apparatus 601.

Note that the sacrificial layer is fabricated at predetermined gaps of, for example, margins of one or more pixels of a resolution, away from a fabrication object in all the X, Y, and Z directions. For example, when sacrificial layer data is integrated to slice data, the sacrificial layer data is integrated so as to have margins of one or more pixels from the layer.

Next, a process of creating sacrificial layer data of a plurality of layers in the above-described example is described with reference to FIGS. 21 and 22.

Figure 21:
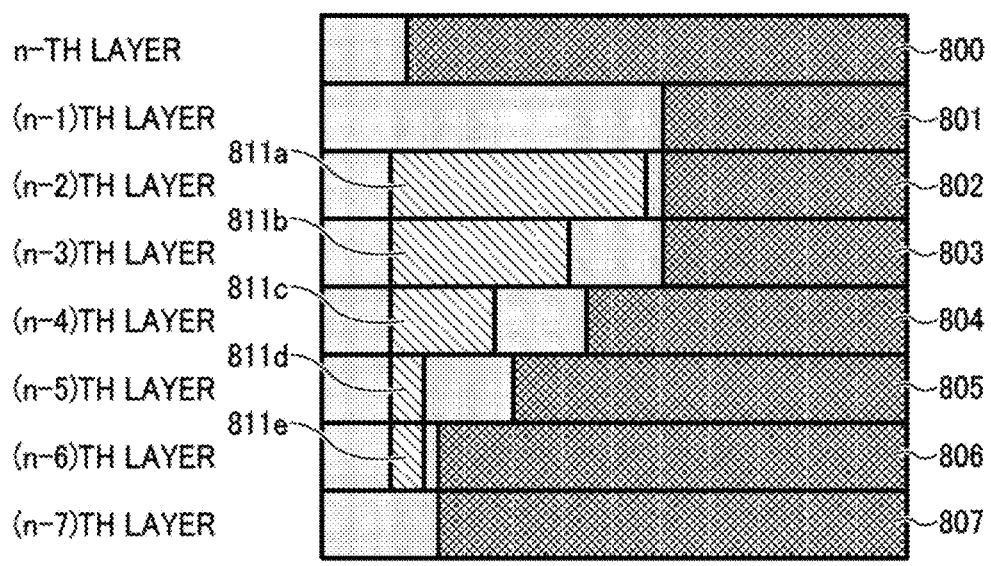
FIG. 21 is an illustration of a process of creating sacrificial layer data for a plurality of layers.

Here, as illustrated in FIG. 21, slice data include fabrication data 800 to 807 corresponding the nth to (n-7)th fabrication layers 30. Here, five layers of sacrificial layer data are created (the above-described "k" is set to 5).

Figure 22B:
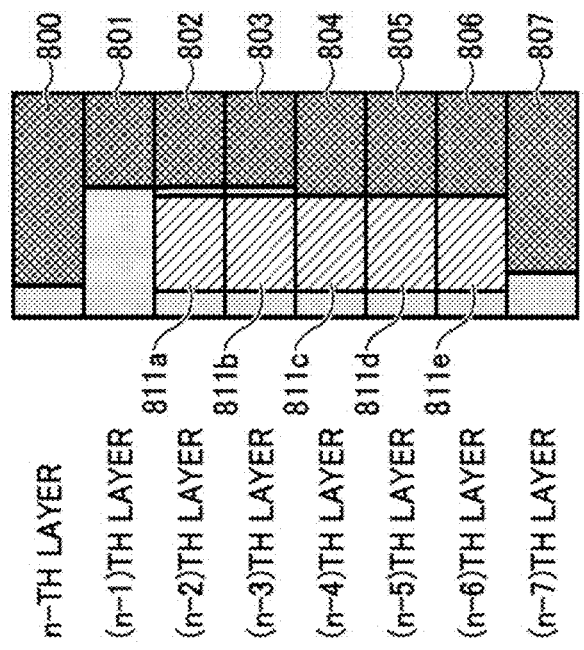
Figure 22A:
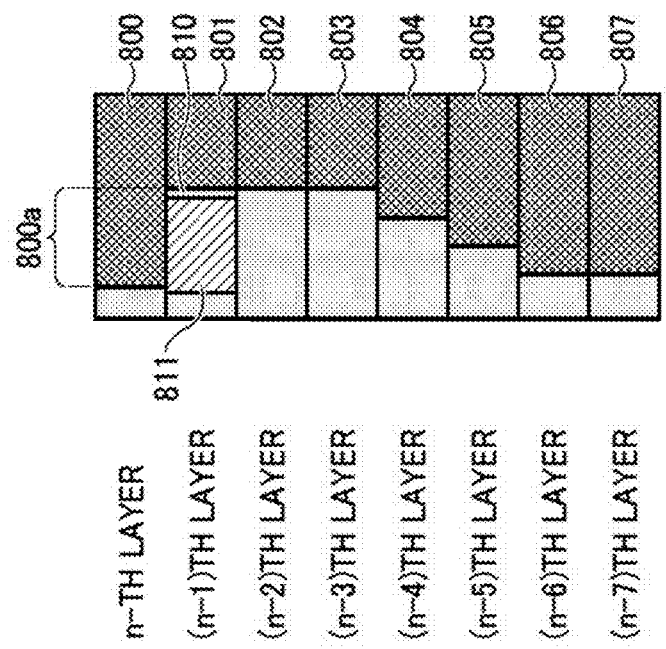

As illustrated in FIG. 22A, the nth-layer fabrication data 800 and the (n-1)th-layer fabrication data 801 are compared (collated) to acquire the overhang portion data 800a in which the fabrication data 800 does not overlap with the fabrication data 801.

In such a case, as illustrated in the slice data of the (n-1)th layer, overhang portion data (sacrificial layer data) 811 is data in which the overhang portion data 800a is expanded to a position away from the fabrication data 801 by a margin 810.

As illustrated in FIG. 22B, the overhang portion data (sacrificial layer data) 811 acquired is once inserted as sacrificial layer data 811a through 811e into slice data of the (n-2)th through (n-6)th layers.

As illustrated in FIG. 22C, when fabrication data 803 through 807 of the (n-2)th through (n-6)th layers overlap with the sacrificial layer data 811a through 811e, the computer deletes the overlap portions from the sacrificial layer data 811a through 811e.

As illustrated in FIG. 22C, the computer determines whether the sacrificial layer data 811 thus corrected overlaps with fabrication data of slice data of one layer below (the (n-m-1)th layer) in the direction of lamination.

In this example, the sacrificial layer data 811b through 811d of the (n-3)th layer through the (n-5)th layer overlap with the fabrication data 804 through 807 of th respective one layers below. As described above, if the fabrication data of slice data of the one layer below overlaps with the sacrificial layer data, a gap having a size of one layer is not secured between the fabrication layer 30 and the sacrificial layer 33.

Hence, as illustrated in FIG. 22D, an overlap portion with the fabrication data of slice data of the one layer below is deleted to obtain final sacrificial layer data 811a through 811d.

Next, a third example of processing of creating fabrication data by a client computer of a fabrication data creation device executed according to a program is described with reference to FIG. 23.

For this example, in the above-described second example, before adding sacrificial layer data for fabricating a sacrificial layer to slice data of from the (n-k)th layer to the (n-2)th layer (S308), at S307 the computer converts the sacrificial layer data into pattern data of thin lines and at S308 adds the sacrificial layer data, which is made of the pattern data of thin lines, to the slice data of from the (n-k)th layer to the (n-2)th layer.

Steps S301 through S306, S309, and S310 are the same as the Steps S201 through 206, S209, and S201. Therefore, redundant descriptions thereof are omitted here.

As described above, fabricating the sacrificial layer with thin-line pattern reduces curling of the sacrificial layer.

Figure 24:
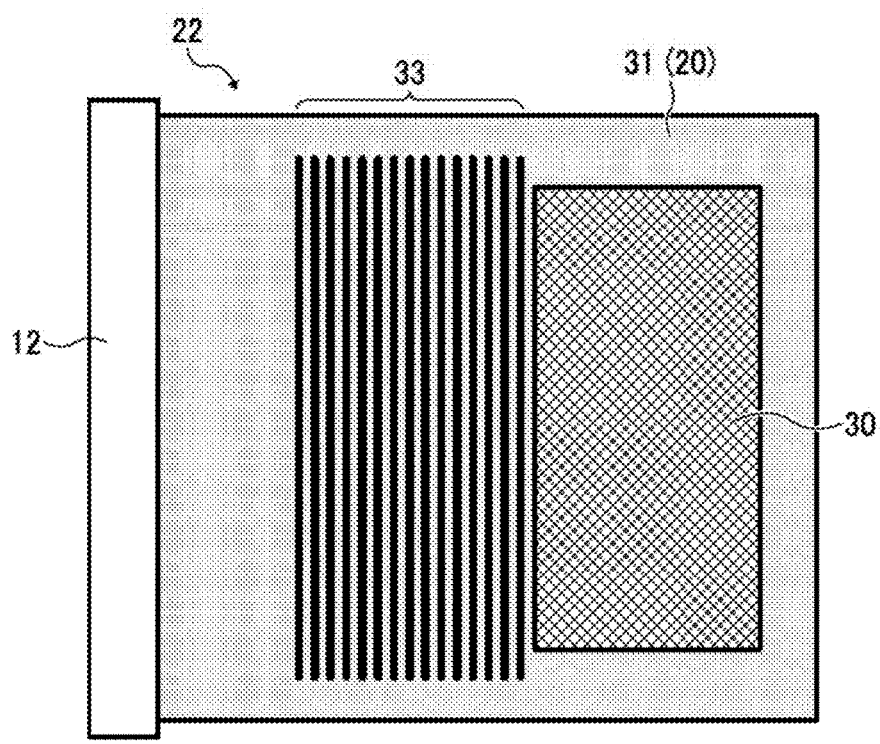
FIG. 24 is a plan view of an example of a fabrication layer and a sacrificial layer of a thin-line pattern formed in a fabrication chamber.

An example of the thin-line pattern as the sacrificial layer is described with reference to FIG. 24. FIG. 24 is a plan view of an example of the fabrication layer and the sacrificial layer formed in the fabrication chamber.

When liquid is discharged to the powder layer 31 to form a fabrication object (a fabrication layer or a sacrificial layer), a fabrication object having a large area may curl upward from the outermost peripheral of the fabrication object, due to aggregation of powder caused by adhesion or drying of liquid.

The degree of curling varies with the area of fabrication data of the fabrication object. The smaller the area, the smaller the curling.

Hence, like the above-described third example, a sacrificial layer 33 is formed in a pattern of thin lines, each having a thickness of at least one pixel of a resolution.

Such a configuration allows the curling of the sacrificial layer 33 to be dispersed to the respective thin lines, thus reducing the curling even if the sacrificial layer 33 has a large area. Reducing the curling allows enhancement of the friction force of powder.

Next, another example of a sacrificial layer pattern made of a thin-line pattern is described with reference to FIGS. 25A through 25F. FIGS. 25A through 25F are plan views of other examples of the sacrificial layer pattern.

Figure 25A:
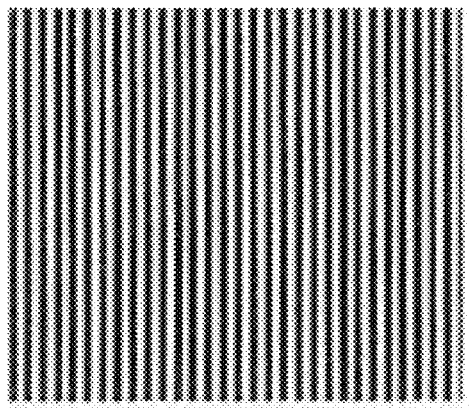
FIGS. 25A through 25F are plan views of other examples of the sacrificial layer of thin-line pattern.
Figure 25B:
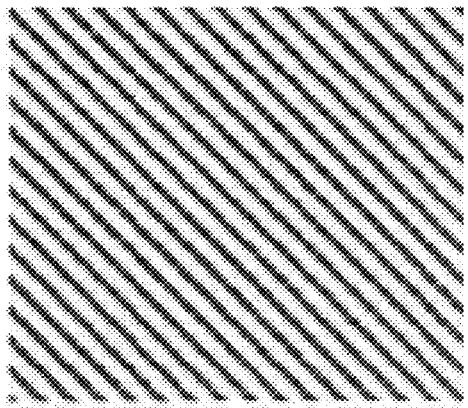
Figure 25C:
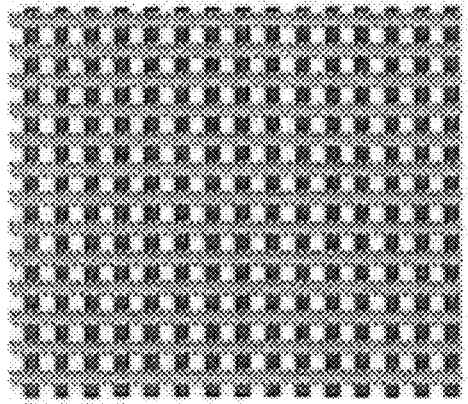
Figure 25D:
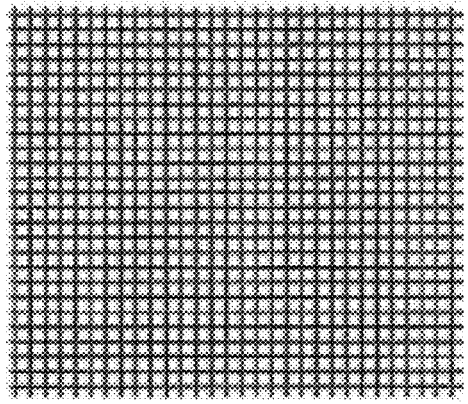
Figure 25E:
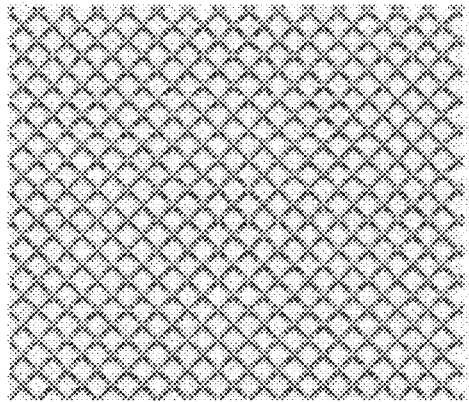
Figure 25F:
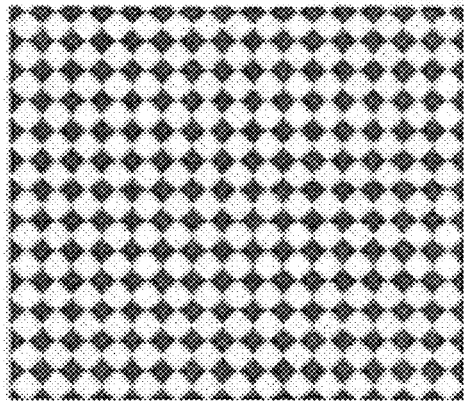

FIG. 25A shows an example of a vertical or horizontal line pattern. FIG. 25B shows an example of a diagonal line pattern. FIGS. 25C and 25D show examples of grid patterns. FIG. 25E shows an example of a diagonal grid pattern. FIG. 25F shows an example of a harlequin check pattern. The thin-line pattern is not limited to the above-described examples and may be any other pattern, for example, a ripple pattern.

When a plurality of sacrificial layers is fabricated, the pattern of each sacrificial layer may be a single pattern or a combination of a plurality of patterns. In such a case, combining a plurality of patterns prevents liquid from being continuously discharged in the Z direction (the direction of lamination), allows adjustment of the rigidness of the sacrificial layer, and reduces the curling of the sacrificial layer.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A method of fabricating a three-dimensional object by laminating plural layered fabrication objects in plural respective powder layers formed one on another in a layering direction, each layered fabrication object including bonded powder in a corresponding powder layer, the method comprising:

(a) forming a lower sacrificial fabrication object in a lower powder layer in which none of the layered fabrication objects is formed by selectively bonding powder in the lower powder layer;

(b) forming the three-dimensional object via the plural layered fabrication objects in the respective powder layers disposed above the lower powder layer in the layering direction by selectively bonding powder in each respective powder layer, each of the plural layered fabrication objects being at least partially disposed above the lower sacrificial fabrication object in the layering direction, unbonded powder being disposed between the three-dimensional object and the lower sacrificial fabrication object in the layering direction;

(c) forming another sacrificial fabrication object which is separate from the lower sacrificial fabrication object, in a same powder layer as a layered fabrication object amongst the plural layered fabrication objects by selectively bonding powder in the same layer, said another sacrificial fabrication object and layered fabrication object formed in the same powder layer being separable from each other, with unbonded powder between said another sacrificial fabrication object and layered fabrication object; and (d) forming a layered fabrication object of the three-dimensional object above and over the another sacrificial fabrication object in the layering direction by selectively bonding powder in the respective powder layer, unbonded powder being disposed between the three-dimensional object and the another sacrificial fabrication object in the layering direction.

2. The method according to claim 1, wherein powder is bonded in each of the powder layers containing bonded powder by discharging a fabrication liquid, and an amount of the fabrication liquid per unit of area in forming said another sacrificial fabrication object by discharging the fabrication liquid to bind the powder is smaller than an amount of the fabrication liquid per unit of area in forming the layered fabrication object in the same powder layer.

3. The method according to claim 1, wherein said another sacrificial fabrication object is formed in (c) as a line pattern.

* * * * *